United States Patent
Skeoch et al.

(10) Patent No.: US 11,703,583 B1
(45) Date of Patent: Jul. 18, 2023

(54) REDUCED RADAR SENSOR POWER CONSUMPTION

(71) Applicant: Amazon Technologies, Inc., Seattle, WA (US)

(72) Inventors: James Steven Skeoch, Palos Verdes Estates, CA (US); Michael Kalajian, Calabasas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 447 days.

(21) Appl. No.: 16/946,189

(22) Filed: Jun. 9, 2020

(51) Int. Cl.
*G01S 13/56* (2006.01)
*G01S 13/536* (2006.01)
*G01S 13/86* (2006.01)
*G01S 7/35* (2006.01)
*G01S 7/41* (2006.01)

(52) U.S. Cl.
CPC ............ *G01S 13/536* (2013.01); *G01S 7/352* (2013.01); *G01S 7/415* (2013.01); *G01S 13/56* (2013.01); *G01S 13/867* (2013.01)

(58) Field of Classification Search
None
See application file for complete search history.

(56) References Cited

U.S. PATENT DOCUMENTS

| | | | | |
|---|---|---|---|---|
| 9,229,102 B1* | 1/2016 | Wright | ................ | G01S 13/885 |
| 2016/0189503 A1* | 6/2016 | Johnson | ................ | E05B 47/00 |
| | | | | 348/152 |
| 2020/0132811 A1* | 4/2020 | Goswami | ................ | G01S 7/415 |
| 2020/0356154 A1* | 11/2020 | Kosugi | ................ | G06F 21/32 |

OTHER PUBLICATIONS

"Pulse-Doppler Radar", https://enwikipedia.org/wiki/Pulse-Doppler_radar, 10 pages, retrieved on Jun. 9, 2020.
"Frequency-Modulated Continuous-Wave Radar (FMCW Radar)," radartutorial.eu, https://www.radarututorial.eu/02.basics/Frequency%20Modulated%20Continuous%20Radar.en.html, 6 pages, retrieved on Jun. 9, 2020.

* cited by examiner

*Primary Examiner* — Erin F Heard
*Assistant Examiner* — Hailey R Le
(74) *Attorney, Agent, or Firm* — Lowenstein Sandler LLP

(57) ABSTRACT

A video recording and communication device includes a camera, a processor, a radar sensor, and memory. The processor executes instructions from memory to cause the device to operate the sensor in a first operational mode in which the camera is maintained in a low-power mode. The processor further detects, using the sensor in the first mode, possible motion of an object within a threshold distance from the sensor. Responsive to the detecting, the processor transitions the sensor from the first mode to a second operational mode. The second mode consumes more power than the first mode. The processor determines, using the radar sensor in the second mode, that the possible motion of the object occurred in a region of interest, in response to which, it transitions the sensor from the second mode to a third operational mode. The third mode consumes more power mode than the second mode.

24 Claims, 10 Drawing Sheets

REDUCED RADAR SENSOR POWER CONSUMPTION

BACKGROUND

Radar sensors can detect the range, velocity, and identity of objects in motion. Radar sensors were originally designed for military and flight applications, but have more recently been manufactured as systems-on-a-chip in smaller form factors, making them adaptable for a wider range of commercial applications. Radar sensors, however, still require significant power to apply advanced measurement capabilities, making them impracticable for employment within low-power devices, including those that rely on battery, fuel cell, or similar power source.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only. These drawings include the following figures, in which like numerals indicate like parts.

DETAILED DESCRIPTION

Figure 1:
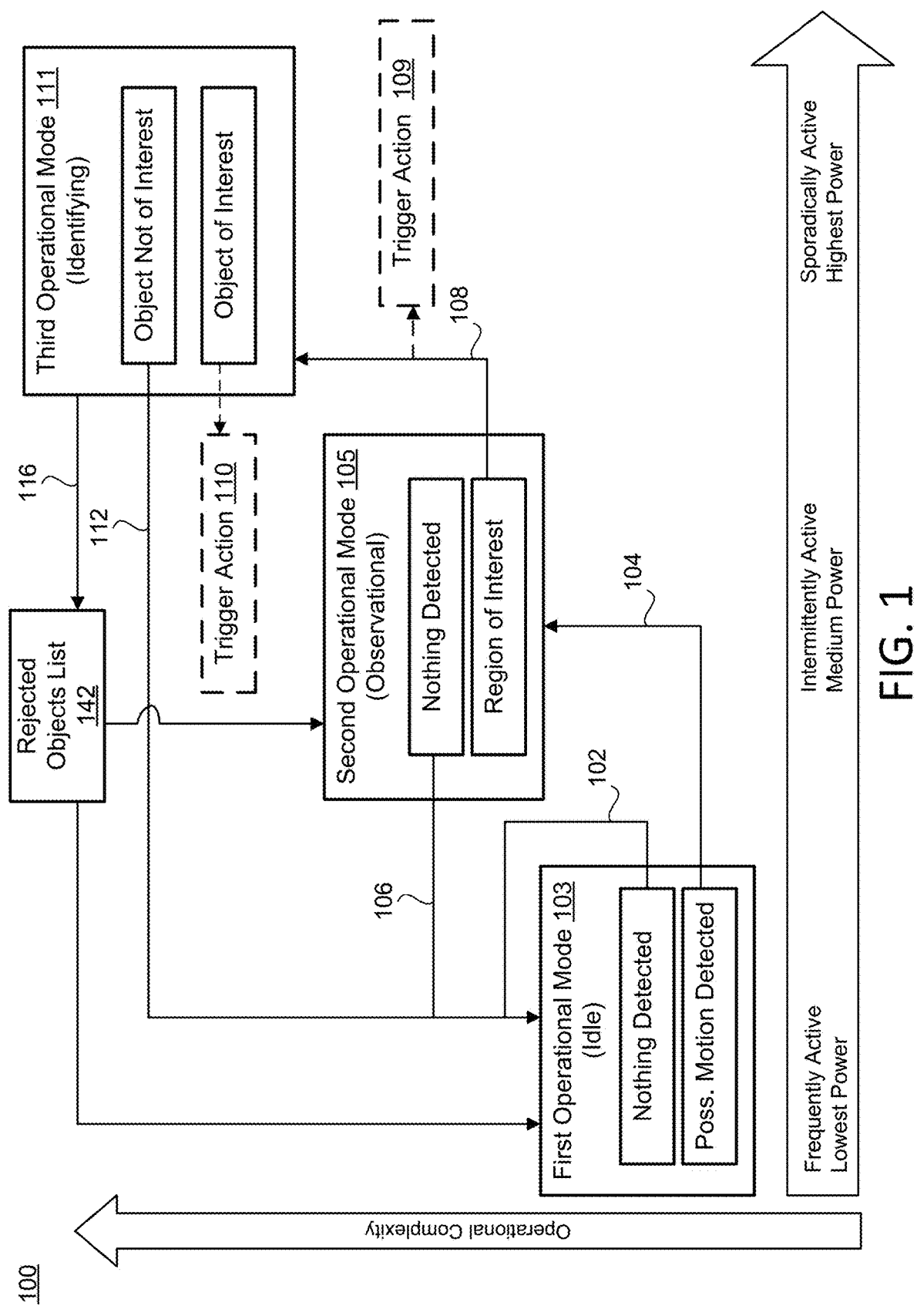
FIG. 1 is a flow diagram illustrating an example method of reducing radar sensor power consumption in an embodiment.

FIG. 1 is a flow diagram illustrating an example method 100 of reducing radar sensor power consumption in various embodiments. For example, a radar sensor 202 may be a motion sensor within an A/V recording and communication device, e.g., a video security device 200 or 300 of FIG. 2 or FIG. 3, respectively, which will be discussed in detail later. In these embodiments, the operational complexity of the radar sensor 202 may be increased in response to moving to higher operational modes of multiple available operational modes, where the higher operational modes consume more power than the lower operational modes. For example, a processor 262 may transition the radar sensor 202 to higher operational modes in response to detecting possible motion of an object within a threshold distance and whether, once detected within the threshold distance, the object is determined to be within a region of interest within a monitored area 201.

An operational mode is a mode of operation of the radar sensor 202 that defines particular parameters and functionality that impact complexity of sensing operations and thus power consumption as well. For example, an operational mode may selectively activate certain hardware within the radar sensor 202. Further, an operational mode may selectively activate certain firmware (or software) processes that are running in that operational mode. As more hardware, sensing resources, and processing power is employed in a higher operational mode, more power is likewise consumed, as will be explained in detail.

Because the monitored area 201 of the video security device for most residences and even businesses remains uninteresting most of the time, a first operational mode 103 may be an idle mode that consumes very little power. If no motion is detected in a field of view of the radar sensor 202, then, at operation 102, the processor 262 may continue to operate the radar sensor 202 in the first operational mode 103. Thus, the first operational mode 103 may be the most frequently active mode (in comparison to other modes described below), and may further operate at the lowest power compared to other modes.

Figure 4A:
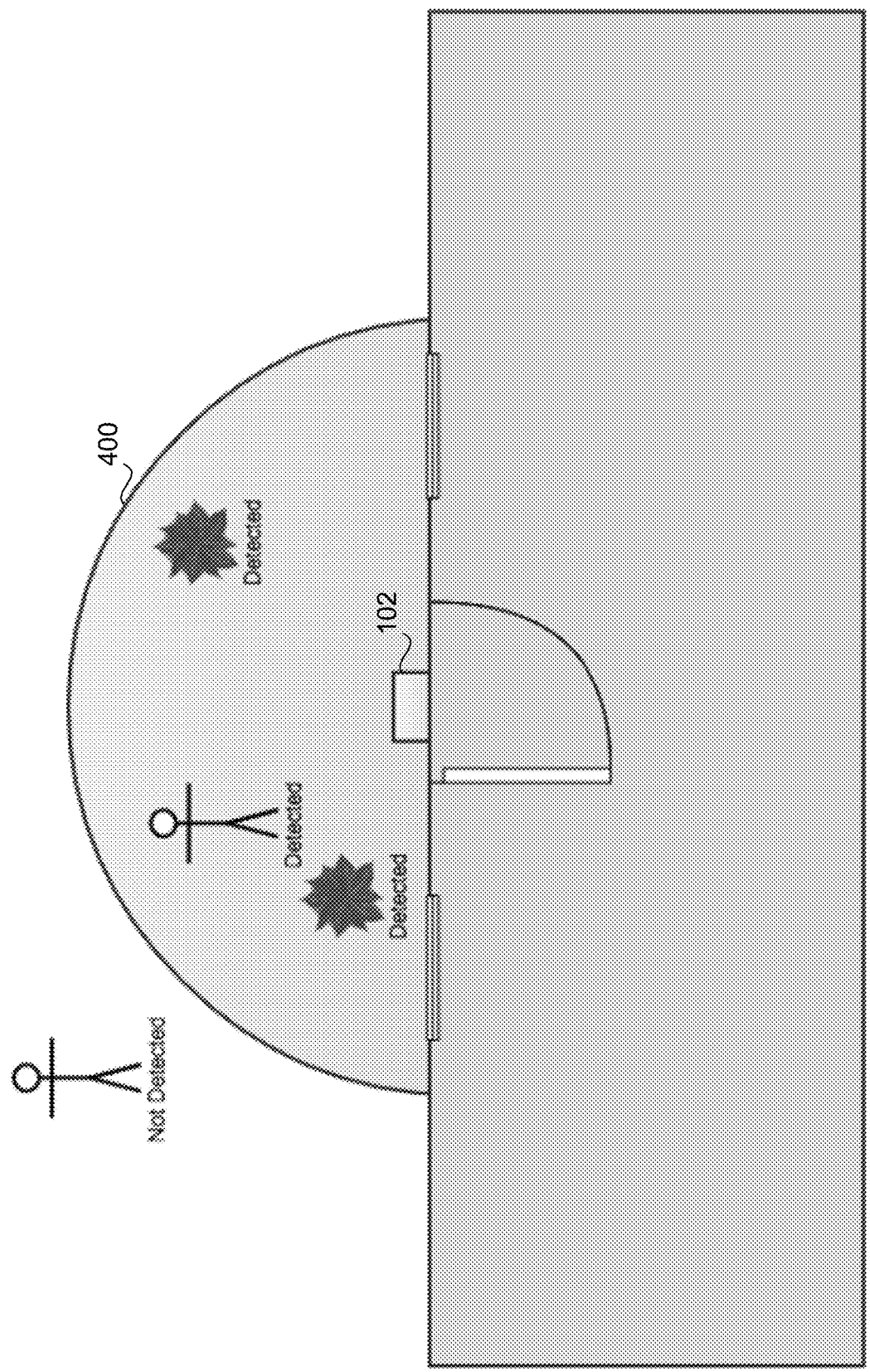
FIG. 4A is a top plan view of an example scene with a radar sensor in a first operational (or idle) mode in an embodiment.

FIG. 4A is a top plan view of an example scene with the radar sensor 202 in the first operational mode 103 in an embodiment. A security perimeter 400 (or radius of interest) may be configured within the radar sensor 202 at a threshold distance from the radar sensor 202. This threshold distance may be user programmable, and thus be set at between approximately 10 and 30 meters depending on application and desired area of coverage of the video security device. Some applications may call for a larger distance than 30 meters, but these may be rare, particularly for a low power video security device.

According to some embodiments, while operating in the idle mode, the radar sensor 202 may be configured with the minimum operational complexity needed in order to make a binary decision, for example, whether or not there is some kind motion present. Tables 1 and 2 below provide examples of operational parameters for the idle mode. Because the idle mode does not have much complexity, the radar sensor 202 may not completely localize the origin of the motion or distinguish between a human-like motion or another type of motion, for example, trees swaying in the wind. While operating in the idle mode, the radar sensor 202 preferably has a zero false-negative rate, but some false-positives are acceptable, where a false-negative occurs when motion is present within the security perimeter 400, but the radar sensor 202 fails to detect the motion, and a false-positive occurs when no motion is present within the security perimeter 400, but the radar sensor 202 detects motion. In the idle mode, the radar sensor 202 is capable of ranging moving objects, and can be configured to set a radial security perimeter, which when breached (or has motion occurring inside) causes the processor 262 to trigger the radar sensor 202 to transition from the first operational mode 103 to a second operational mode 105, also referred to herein as an observational mode.

While operational parameters may be adjusted within particular ranges, Table 1 includes an example set of operational parameters for a frequency-modulated continuous wave (FMCW) radar that would retain the idle mode 103 at the lowest power. Further, Table 2 includes an example set of operational parameters for pulse radar that would retain the idle mode 103 at the lowest power. Only one active receive antenna is needed to detect possible motion within the threshold distance from the radar sensor 202. Additional operational parameter ranges and target power consumptions are envisioned.

TABLE 1

Operational Parameters for FMCW Radar, Idle Mode

| Mode | First Operational (Idle) |
|---|---|
| Chirps per Frame | 1 |
| Frames per Second | 1-4 |
| Chirp Duration | 80-140 μs |
| Antenna Configuration | 1-Tx/1-Rx |
| Target Power Consumption | <1 mW |
| DSP/CPU Functions | Stationary Object Removal, Range FFT, Amplitude Thresholding |

TABLE 2

Operational Parameters for Pulse Radar, Idle Mode

| Mode | First Operational (Idle) |
|---|---|
| First Pulse Width | 10+ μs |
| First Pulse Rate | 1-10 kHz |
| Antenna Configuration | 1-Tx/1-Rx |
| Target Average Power Consumption | <1 mW |
| DSP/CPU Functions | Stationary Object Removal, Range FFT, Amplitude Thresholding |

With reference to Table 1, in FMCW radar, a transmitted signal of a known stable frequency continuous wave varies up and down in frequency over a fixed period of time by a modulating signal. The frequency difference between the receive signal and the transmit signal increases with delay, and hence with distance. This smears out, or blurs, the Doppler signal. Reflections (or echoes) received back from a target are then mixed with the transmitted signal to produce a beat signal, which gives the distance of the target after demodulation. While uses of the term vary in the art, "chirps" herein refer to a cycle of a radar signal that changes in frequency throughout a period of time before repeating.

Furthermore, a frame may be understood to be a period of time during which the radar sensor 202 samples the monitored area 201 with the transmit signal, which includes the chirps, to capture a data set capable of being processed by one or more processing functions to perform object detection. As such, each frame may include multiple chirps in order to capture sufficient data for object detection processing, although a single chirp is sufficient for mere motion detection. A chirp that is sent out reflects off surfaces and returns to the radar sensor 202 as reflection signals.

Accordingly, the more chirps that are sent out per frame, the more data is available to be processed, and the more accurately objects may be detected. Because detecting the returned reflections, converting the returned reflections into data, and processing that data consumes power, the more chirps per frame, the more frames per second, and the longer the chirp duration, the more power consumed. The more receive antennas that are active likewise increases power consumption because more reflections may be detected, converted, and processed. Additionally, the more digital signal processing (DSP) or central processing unit (CPU) processing functions employed, particularly those requiring at least two active receive antennas, will also consume more power for the reasons discussed, and due to increased processing power required of the processor 262. The DSP/CPU functions will be discussed in more detail later.

With reference to Table 2, a pulse radar is a radar system that employs a repetitive series of short-duration pulses that make up a larger pulse. Each larger pulse may thus define a pulse width or a pulse duration. A pulse repetition period, e.g., the period between each large pulse, may define a pulse rate, e.g., the number of the large pulses per second. The reflected radar signals, from the transmitted radar pulses, may be processed in order to determine distance.

The range accuracy of a pulse radar depends on the width of the pulse: the shorter the pulse, the better the accuracy. Short pulses, however, require wide bandwidths in the receiver and transmitter (since bandwidth is equal to the reciprocal of the pulse width). The bandwidth (BW) is the difference between the upper and lower cut-off frequencies of the transmitter and receiver, and is usually measured in hertz (Hz). Because a pulse radar does not radiate continually, the average power is much less than the peak power. The average power, rather than the peak power, is the measure of the capability of a pulse radar system. Radar systems have average powers from a few milliwatts (mW) to as much as one or more megawatts (MW), depending on the application. A pulse radar consumes more power at a higher bandwidth, thus lower pulse width, and at higher frequencies, thus higher pulse rate.

With continued reference to FIG. 1, in response to the radar sensor 202 detecting possible motion of an object within the threshold distance from the radar sensor 202, then at operation 104 the processor 262 may transition the radar sensor 202 from the first operational mode 103 to a second operational mode 105 (e.g., observational mode), which may be a higher operational mode than the first operational mode 103. The second operational mode 105 may consume a medium level of power and be intermittently active. For example, if the possible motion turns out to be nothing of interest (e.g., a tree swaying in the wind), or is an object that just temporarily crossed the security perimeter 400, then, at operation 106, the processor 262 may transition the radar sensor 202 back to the first operational mode 103.

Figure 4B:
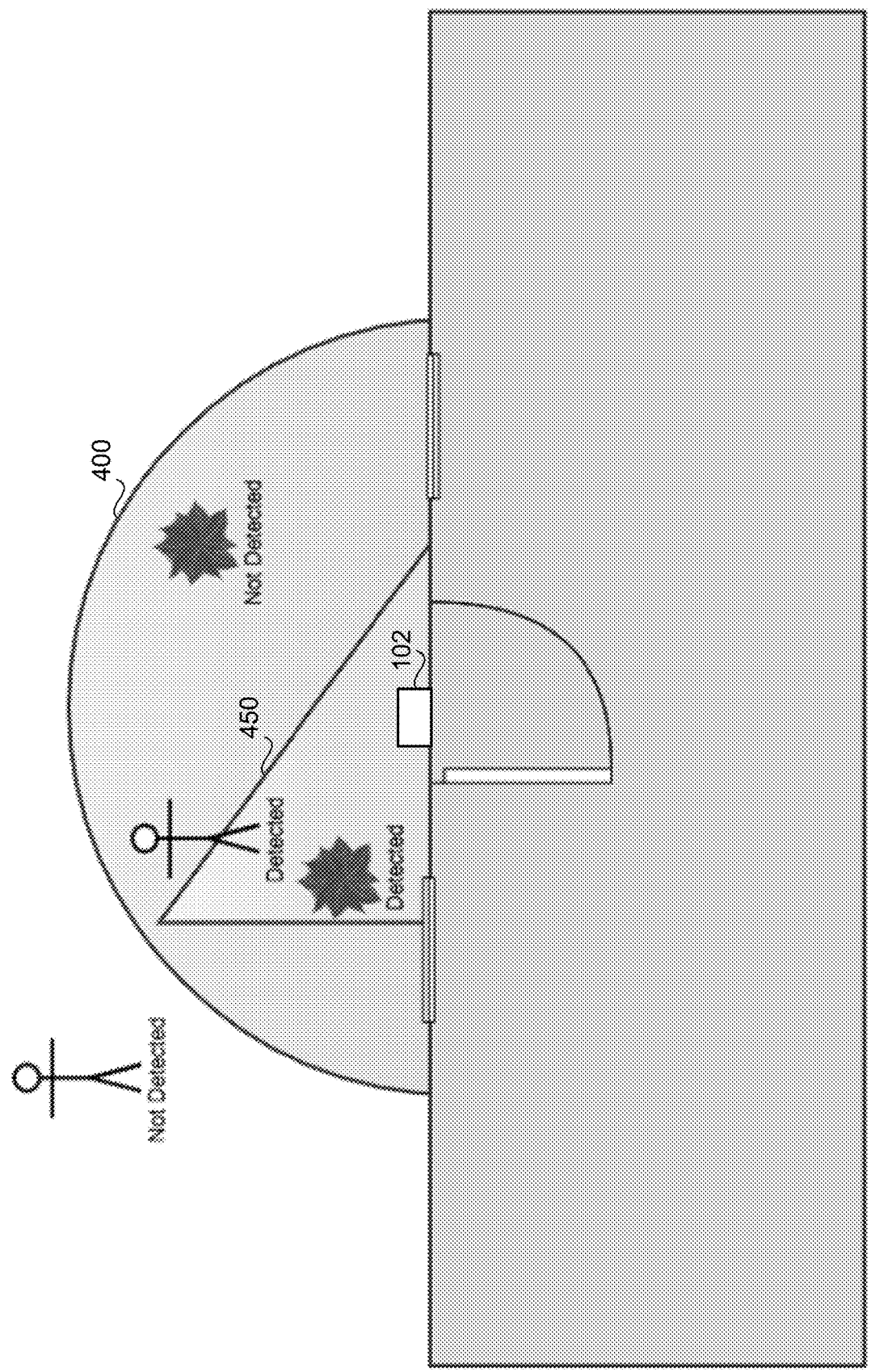
FIG. 4B is a top plan view of the example scene with the radar sensor in a second operational (or observational) mode in an embodiment.

FIG. 4B is top plan view of the example scene with the radar sensor 202 in the second operational mode 105 in an embodiment. A region of interest 450 may further be defined that is located within the security perimeter 400, and that is of interest to protect. This region of interest 450 may also be user programmable, and may cover a portion of the monitored area 201 that is likely to cover paths of ingress and egress of human traffic into and out of the home. While in the observational mode 105, the radar sensor 202 may better localize the source of motion and determine whether the activity detected by the idle mode 103 was a false-positive, e.g., a motion outside of the region of interest 450. The better localization may be achieved by using two receive antennas, and by the radar sensor 202 using angle of arrival (AoA) estimation to determine a direction with reference to the radar sensor 202 from which the motion is being detected.

Using AoA and two receive antennas in the observational mode 105 consumes more power than the idle mode 103.

TABLE 3

Operational Parameters for FMCW Radar, Observational Mode

| Mode | Second Operational (Observational) |
| --- | --- |
| Chirps per Frame | 1-2 |
| Frames per Second | 5-15 |
| Chirp Duration | 330-550 µs |
| Antenna Configuration | 1-Tx/2-Rx |
| Target Power Consumption | <10 mW |
| DSP/CPU Functions | Stationary Object Removal, Range FFT, Amplitude Thresholding, Angle of Arrival (AoA) Estimation |

By way of example, Table 3 includes an example set of operational parameters for FMCW radar that would put the radar sensor 202 in at least one observational mode at a medium power compared to the first and third operational modes. Further, Table 4 includes an example set of operational parameters for pulse radar that would put the radar sensor 202 in at least one observational mode at a medium power.

TABLE 4

Operational Parameters for Pulse Radar, Observational Mode

| Mode | Second Operational (Observational) |
| --- | --- |
| Second Pulse Width | 30-50 ns |
| Second Pulse Rate | 11-99 kHz |
| Antenna Configuration | 1-Tx/2-Rx |
| Target Average Power Consumption | <10 mW |
| DSP/CPU Functions | Stationary Object Removal, Range FFT, Amplitude Thresholding, Angle of Arrival (AoA) Estimation |

With continued reference to FIG. 1, in response to the radar sensor 202 detecting that the motion of the object occurred in the region of interest 450, the processor 262, at operation 108, may transition the radar sensor 202 from the second operational mode 105 to a third operational mode 111. The third operational mode 111 may be an identifying mode that is a higher operational mode than the second operational mode 105. The identifying mode 111 may operate at a highest level of power compared to the idle and observational modes 103, 105, and may be sporadically active depending on presence of an object within the region of interest 450, and whether or not the object is of interest, e.g., whether or not the object is a person.

Figure 4C:
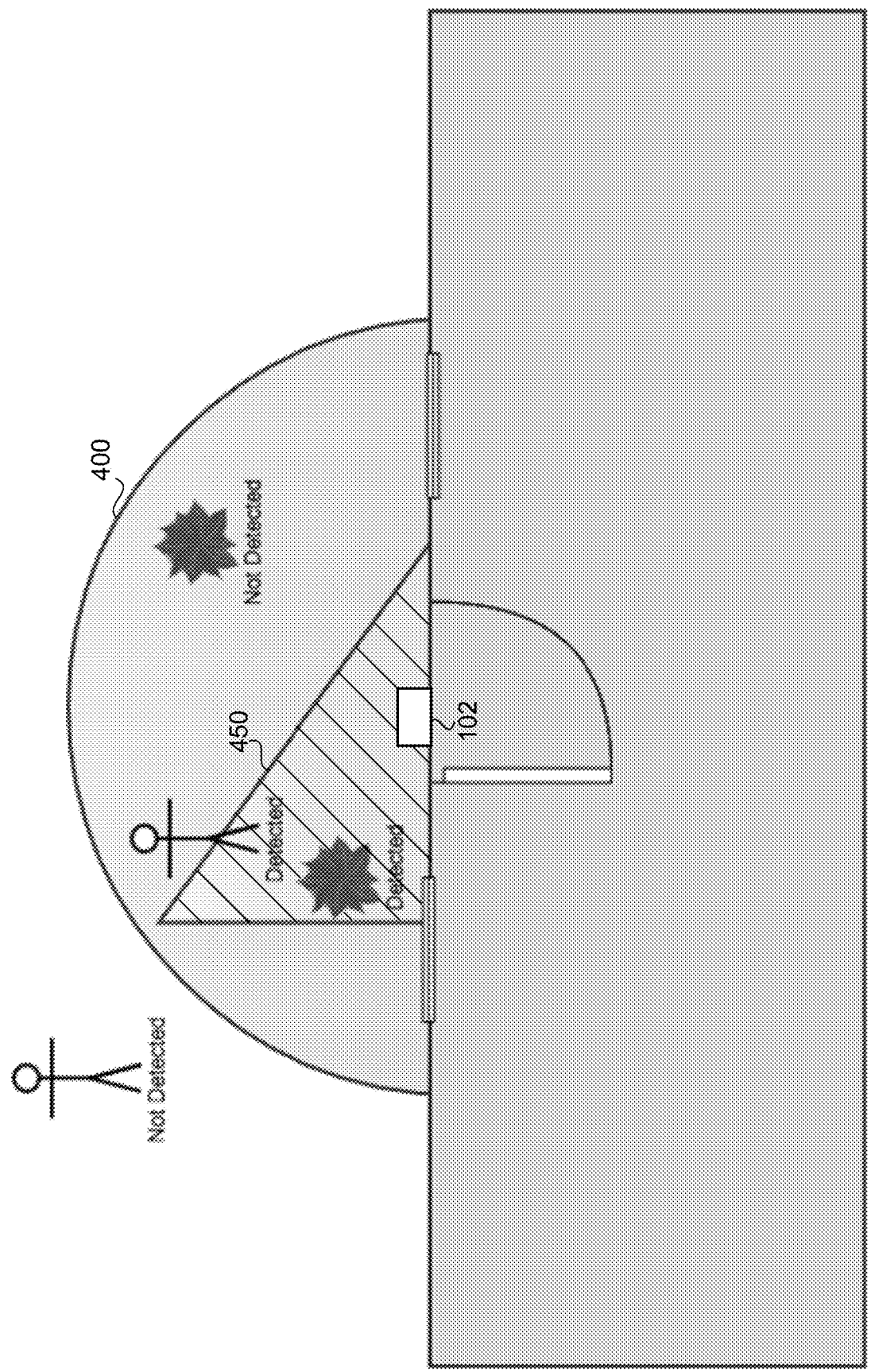
FIG. 4C is a top plan view of the example scene with the radar sensor in a third operational (or identifying) mode in an embodiment.

FIG. 4C is a top plan view of the example scene with the radar sensor 202 in the third operational mode 111 in an embodiment. The region of interest 450 has cross-hatching to emphasize that the object within the region of interest 450 may also be determined to be human and thus a potential threat. The radar sensor 202 may also be adapted to recognize other objects of interest as potential threats, such as a car, a motorcycle, a drone, or the like.

In various embodiments, by the time the processor 262 invokes or transitions to the identifying mode (e.g., third operational mode 111), a moving object inside the region of interest 450 has been detected, but has not yet been classified as a threat. The radar sensor 202, therefore, may operate in the identifying mode in order to analyze the trajectory and motion characteristics of the object to understand whether the object is of interest, e.g., is a human or some other object of interest. The addition of Doppler FFT processing to the list of DSP functions in the identifying mode 111 allows determination of an identity of the object, including whether the object is human or some other object of interest that may indicate a threat. The identifying mode 111 consumes more power than the observational mode 105, at least because the identifying mode 111 uses both AoA and Doppler FFT processing, and requires at least two receive antennas.

By way of example, Table 5 includes an example set of operational parameters for FMCW radar that would put the radar sensor 202 in the third operational (or identifying) mode at a highest power compared to the first and second operational modes. Further, Table 6 includes an example set of operational parameters for pulse radar that would put the radar sensor 202 in the identifying mode.

TABLE 5

Operational Parameters for FMCW Radar, Identifying Mode

| Mode | Third Operational (Identifying) |
| --- | --- |
| Chirps per Frame | 2-64 |
| Frames per Second | 15-40 |
| Chirp Duration | 900-1300 µs |
| Antenna Configuration | 1-Tx/2-Rx |
| Target Power Consumption | <100 mW |
| DSP/CPU Functions | Stationary Object Removal, Range FFT, Amplitude Thresholding, AoA Estimation, Doppler FFT processing |

TABLE 6

Operational Parameters for Pulse Radar, Identifying Mode

| Mode | Third Operational (Identifying) |
| --- | --- |
| Third Pulse Width | 0.5-29 ns |
| Third Pulse Rate | 100 kHz to 1 GHz |
| Antenna Configuration | 1-Tx/2-Rx |
| Target Average Power Consumption | <100 mW |
| DSP/CPU Functions | Stationary Object Removal, Range FFT, Amplitude Thresholding, Angle of Arrival (AoA) Estimation, Doppler FFT processing |

Figure 2:
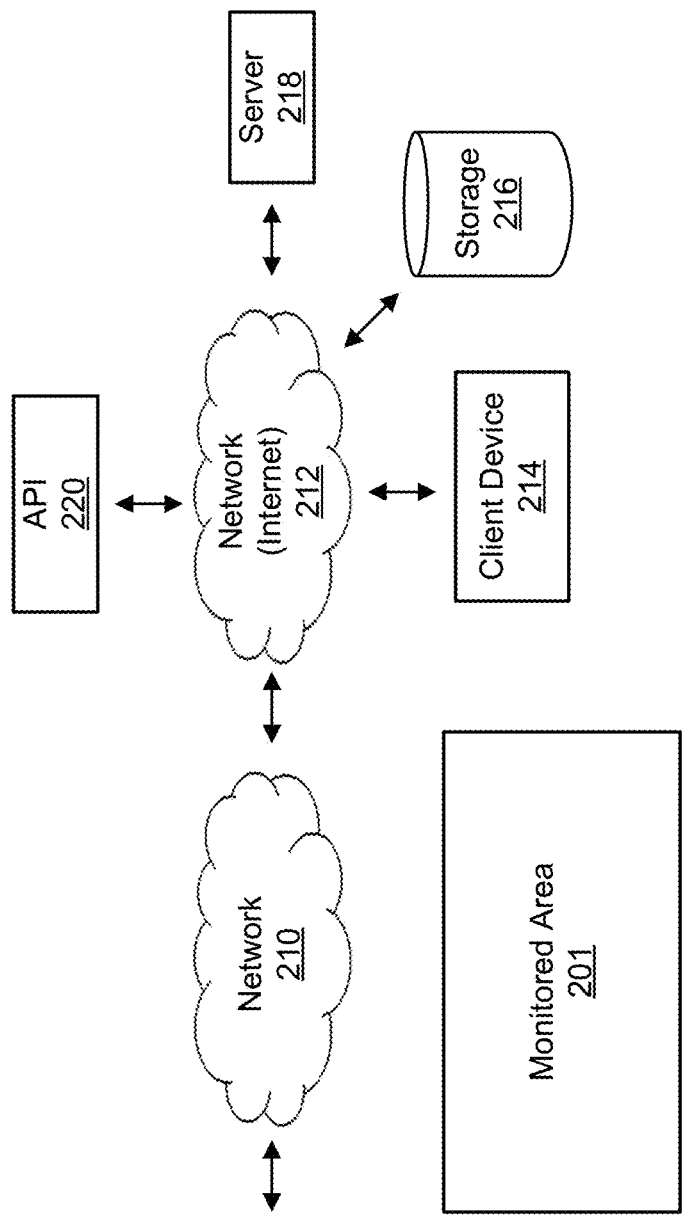
FIG. 2 is a functional block diagram of an audio/video (A/V) recording and communication device deployed within a security system in an embodiment.
Figure 2:
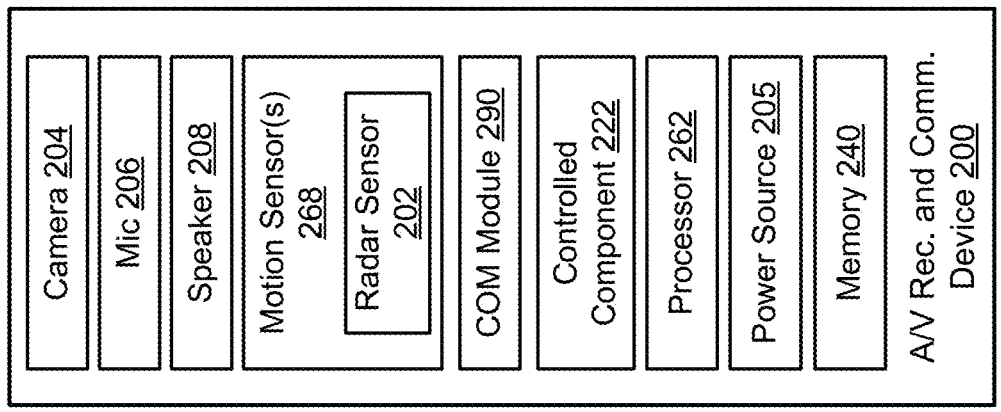

With additional reference to FIG. 1, in some embodiments, in response to transitioning the radar sensor 202 from the second operational mode 105 to the third operational mode 111, the processor 262, at operation 109, may trigger a first action. The action 109 may be, for example, to activate a camera 204 (FIG. 2), to activate one or more additional controlled components 222, and/or to activate one or more of illumination sources 270 (FIG. 2). In this way, increased monitoring capacity is not activated until there is a potential threat to which to respond, which allows saving significant power. In alternative embodiments, the video security device waits even longer to trigger the action, such as, for example, until after determining that a detected object is an object of interest, such as a person, e.g., a human. The alternative embodiment is illustrated in FIG. 1 as a Trigger Action 110 in dashed lines. Once the camera 204 is activated, the camera 204 may record video and store the video in the buffer 248 located in the memory 240. The video stored in the buffer 248 may be added to video sent to the server 218 and/or the client device 214 in response to confirming that the object is of interest.

In some embodiments, the processor 262 of the video security device may instead determine that the object detected while in the observational mode 105 is an object that is not of interest, such as a leaf, branch, cat, or the like. This decision may also be referred to as rejecting the object as being of interest. In response, the processor 262, at operation 112, may transition the radar sensor 202 from the third operational mode 111 to the first operational mode 103. The radar sensor 202 may save power by returning to a lower operational mode after confirming, while in the identifying (or highest power) mode 111, that the object is not of interest.

In alternative or additional embodiments, and with reference to FIG. 1, in response to determining that the object is not of interest, the processor 262, at operation 116, may further store radar signature data associated with the rejected object in a rejected objects list 242. The radar signature data may include values for distance from the radar sensor 202, intensity of the reflection signals detected by the radar sensor 302, angle of arrival (AoA) of the reflected signals, as well as an identity of the object if the processor 262 is able to categorize the particular object that is being rejected. The categorization of the object may be by way of comparison to pre-stored radar signatures for known objects. The distance may be in meters (or another unit of measurement) and be within the security perimeter 400. The intensity may be measured by the receiver of the radar sensor 202 in decibels (dB) or another unit of measurement. The AoA may be measured as a direction, such as an azimuth, with reference to the position of the radar sensor 202. The radar sensor 202 may then, after returning to the first operational mode 103 and/or after transitioning to the second operational mode 105, be able to perform a comparison against the radar signature data stored in the rejected objects list 242 to avoid unnecessarily transitioning to higher power stages only to be repeatedly rejected.

More specifically, in one embodiment, while the radar sensor 202 is in the first operational mode 103, the processor 262 detects, using the radar sensor 202, possible motion of a second object within the threshold distance from the radar sensor 202. The processor 262 may further determine, via comparison of detection data of the second object to the radar signature data for the rejected object stored in the rejected objects list 242, that the second object is the rejected object. The processor 262 may then maintain operation of the radar sensor 202 in the first operational mode 103 instead of transitioning to the second operational mode 105. The detection data for the second object may also include values of both distance from the radar sensor 202 and intensity of reflection signals detected by the radar sensor 202. These values may be compared with those stored within the radar signature data of the rejected object to determine whether they are a match. A threshold level of matching may be used, such as 85% or 95% (or another threshold value) in order to determine whether the rejected object is the same as the second object.

Further, according to another embodiment, while the radar sensor 202 is in the first operational mode 103, the processor 262 detects, using the radar sensor 202, possible motion of a second object within the threshold distance from the radar sensor 202. Responsive to detecting the possible motion of the second object, the processor 262 may transition the radar sensor 202 from the first operational mode 103 to the second operational mode 105. Despite making a comparison to the radar signature data in the rejected objects list 242, the detection data obtained in the first operational mode 103 may be insufficient to cause the comparison to yield a match to the radar signature data of the rejected object. The processor 262 may then, while operating the radar sensor 202 in the second operational mode, determine, via comparison of detection data of the second object to the radar signature data for the rejected object stored in the rejected objects list 242, that the second object is the rejected object. In addition to distance from the radar sensor 202 and intensity of reflection signals detected by the radar sensor, this detection data (in the second operational mode) may also include angle of arrival (AoA) information. The AoA information may provide an additional data point for comparison to the radar signature data of the rejected object. The processor 262 may further, responsive to determining that the second object is the rejected object, transition operation of the radar sensor 202 from the second operational mode 105 to the first operational mode 103. In this way, despite unnecessarily transitioning to the second operational mode 105, the processor 262 can avoid a further transition to the third operational mode 111 should the rejected object move into the region of interest 450 that would trigger such a transition.

FIG. 2 is a functional block diagram of an A/V recording and communication device deployed within a security system. The A/V recording and communication device may also be referred to herein as a video security device 200 for simplicity. The video security device 200 may include the camera 204, a power source 205, a microphone 206, a speaker 208, at least one controlled component 222, a memory 240, the processor 262, one or more motion sensors 268 (including the radar sensor 202), and a communication module 290. The controlled component 222 may include, but is not limited to, a doorbell, an internal floodlight, an external floodlight, or another security device. The video security device 200 may be configured to monitor a monitored area 201. The processor 262 may include, and may also be referred to as, a controller or a microcontroller, and may include multiple processors in some embodiments.

In an example mode of operation, the video security device 200 communicates with a wireless network 210 of a user. Although the wireless network 210 is referred to herein as "wireless," in some embodiments may not be wireless, such as where the video security device 200 is connected to the user's network via an Ethernet connection, for example. The wireless network 210 is connected to another network 212. The networks 210 and 212 may be the same network, in some of the present embodiments. The networks 210 and 212, may include but are not limited to the Internet, a Wi-Fi network compatible with the IEEE 802.11 standard and/or other wireless communication standard(s) including but not limited to WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), Z-Wave, RIM (Research in Motion, Limited) duplex paging network, Bluetooth radio, an IEEE 802.11-based radio frequency network, or a combination thereof.

As described below, the video security device 200 may communicate with a client device 214 of the user via the wireless network 210 and/or the network 212. The client device 214 may include, for example, a computer, a laptop, a tablet, a mobile telephone (may also be referred to as a cellular telephone), such as a smartphone, a personal digital assistant (PDA), or another communication device capable of receiving and/or transmitting data across one or both of the networks 210, 212. The client device 214 may include a display (e.g., similar to the user interface (display) 806 of FIG. 8, described below) and related components capable of displaying streaming and/or recorded video images. The client device 214 may also include a speaker and related components capable of broadcasting streaming and/or recorded audio, and may also include a microphone.

The video security device 200 may also communicate with one or more remote storage device(s) 216, one or more servers 218, and/or an application programming interface (API) 220 via the wireless network 210 and the network 212 (Internet/PSTN). While FIG. 2 illustrates the remote storage device 216, the server 218, and the API 220 as components separate from the network 212, it is to be understood that the remote storage device 216, the server 218, and/or the API 220 may be considered to be components of the network 212.

According to one or more aspects of the present embodiments, when a person (may be referred to interchangeably as "visitor") arrives at the video security device 200, the video security device 200 detects the visitor's presence and begins capturing video images within a field of view of the camera 204. The field of view of the camera 204 may correspond to the monitored area 201. The video security device 200 may also capture audio through the microphone 206. The video security device 200 may detect the visitor's presence by detecting motion using the camera 204 and/or the motion sensor 268, and/or by detecting that the visitor has depressed a button (e.g., a doorbell button) on the video security device 200.

In response to the detection of the visitor, the video security device 200 sends an alert to the client device 214 via the wireless network 210 and/or the network 212. The video security device 200 may also send video, and may also send audio, to the client device 214 of the user (e.g., via the network 212 and/or the server 218). If the user answers the alert, two-way audio communication may then occur between the visitor and the user through the video security device 200 and the client device 214. The user may view the visitor throughout the duration of the call, but the visitor cannot see the user (unless the video security device 200 includes a display, which it may in some embodiments).

The video images captured by the camera 204 of the video security device 200 (and, in some embodiments, the audio captured by the microphone 206) may be uploaded and recorded on the remote storage device 216. In some of the present embodiments, the video and/or audio may be recorded on the remote storage device 216 even if the user chooses to ignore the alert sent to the user's client device 214. In such embodiments, the user may access the video and/or audio at a later time by accessing the remote storage device 216 using the user's client device 214.

The API 220 may include, for example, a server (e.g., a bare-metal server, or a virtual machine, or a machine running in a backend infrastructure as a service), or multiple servers networked together, exposing at least one API to client(s) accessing it. These servers may include components such as application servers (e.g., software servers), depending upon what other components are included, such as a caching layer, or database layers, or other components. The API 220 may, for example, include many such applications, each of which communicate with one another using their public APIs. In some embodiments, the API 220 may hold the bulk of the user data and offer the user management capabilities, leaving the clients to have very limited state.

The API 220 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

In various embodiments, the API 220 includes one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

The memory 240 may be transitory and/or non-transitory and may represent one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of the memory 240 may be integrated with the processor 262.

Figure 3:
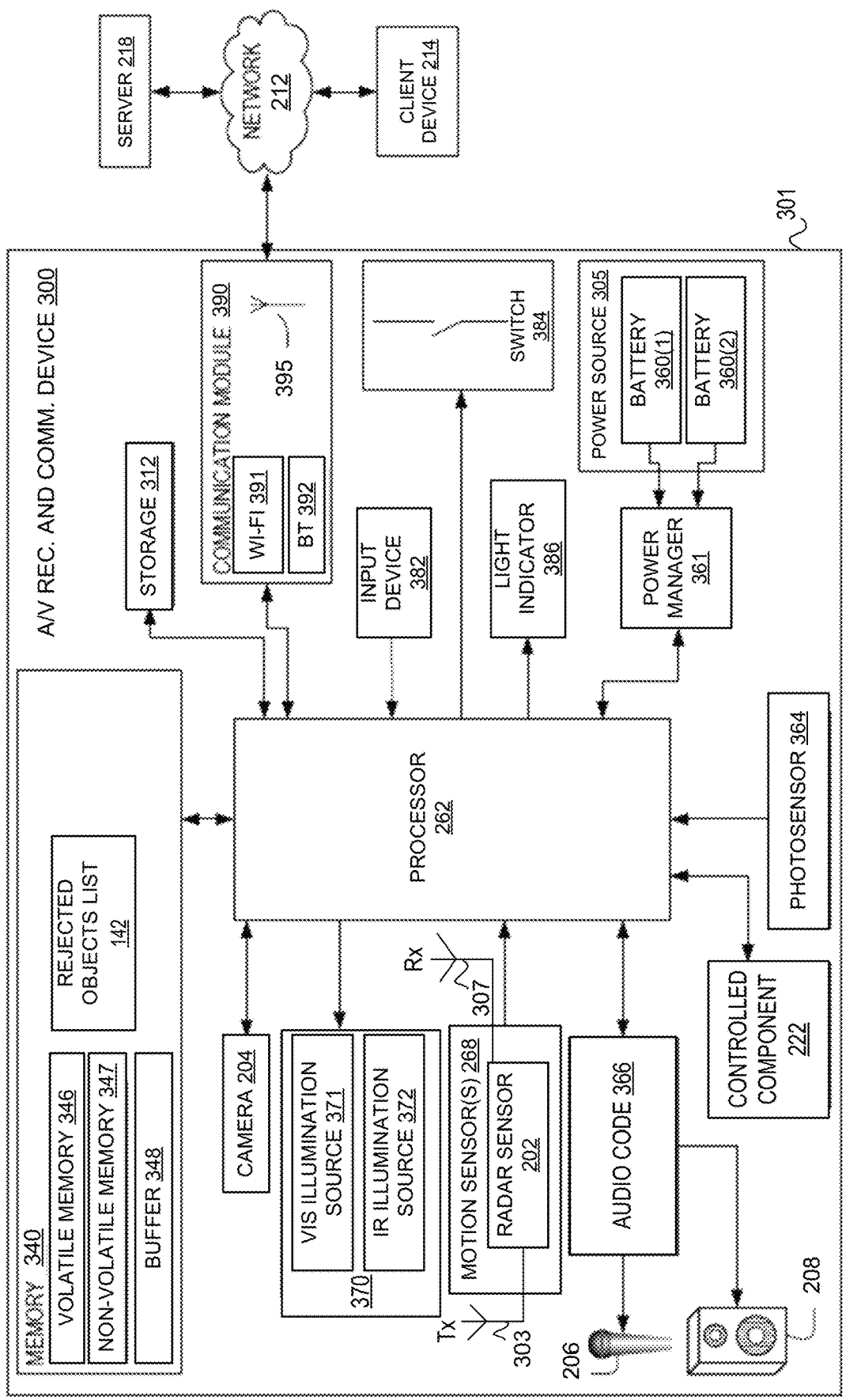
FIG. 3 is a functional block diagram of a more-detailed example of the A/V recording and communication device of FIG. 1 in an embodiment.

FIG. 3 is a functional block diagram illustrating components of a more-detailed example of an A/V recording and communication device, or more simply a video security device 300, which is an embodiment of the video security device 200 of FIG. 2. In various embodiments, the video security device 200 includes a power source 305, a memory 340, and a communication module 390, which are examples of the power source 205, the memory 240, and the communication module 290, respectively, of the video security device 200. An embodiment of the video security device 300 may also include the controlled component 222, a housing 301 to encapsulate the majority of the illustrated components, a photosensor 364, an audio codec 366, an illumination source 370, an input device 382, a light indicator 386, each of which, when included, may be communicatively coupled to the processor 262, which will be discussed.

The video security device 300 may also include a power manager 361. The power source 305 includes at least two batteries 360(1) and 360(3), in some of the present embodiments. However, in other embodiments, the power source 305 may include more or fewer batteries, including zero batteries if the power source 305 is hardwired to an electrical power source of a structure to which the video security device 300 is mounted. In alternative embodiments, the batteries 360(1) and 360(2) are fuel cells, solar arrays, or other low voltage power source. Each of the batteries 360(1) and 360(2) may be electrically connected to the power manager 361. The audio codec 366 may drive the speaker 208 and receive input from the microphone 206. The illumination source 370 may include a visible illumination source 371 and an infrared illumination source 372. The input device 382 may be, for example, a button, an electrical switch, and/or a manually operated electromechanical device.

The power manager 361 manages the power source 305 to provide electrical power to operate the video security device 300, as described below. The power manager 361 may include an electronic circuit that operates to condition power from the batteries 360 and to select which of the batteries 360(1) and 360(2) (in embodiments with more than one battery) power is drawn from. For example, the power manager 361 may draw power from the battery 360(1), and may switch to draw power from the battery 360(2) when the battery 360(1) is drained. By drawing power from only one of the batteries 360 at a time, the video security device 300 may continue operation when the depleted one of the batteries 360 is removed for recharging. In some embodiments, the video security device 300 may further include a switch 384 controlled by the processor 262 to activate the external illumination source 370.

The processor 262 may perform data processing and various other functions of the video security device 300, as described below. The memory 340 may include volatile memory 346 and non-volatile memory 347. In some embodiments, the processor 262, the volatile memory 346, the non-volatile memory 347, and/or programmable input/output peripherals (not shown) may be configured as an integrated circuit. The volatile memory 346 may be implemented as DDR3 or DDR4 SDRAM (double data rate type three or four synchronous dynamic random-access memory) or the like future generation memory. The non-volatile memory 347 may be implemented as NAND flash memory. The memory 340 may store instructions, that when executed by at least one processor such as the processor 262, cause the disclosed video recording and communication device to perform functions in relation to operation of the components coupled to the processor 262 in FIG. 3.

Although the volatile memory 346 and the non-volatile memory 347 are shown outside the box representing the processor 262 in the example of FIG. 3, in some embodiments the volatile memory 346 and/or the non-volatile memory 347 may be physically incorporated with the processor 262, such as on the same integrated circuit (chip). The volatile memory 346 and/or the non-volatile memory 347, regardless of their physical location, may be shared by one or more other components (in addition to the processor 262) of the video security device 300. In certain embodiments, the video security device 300 includes additional storage 312 that may be implemented as any type of non-volatile data storage, such as, for example, and without limitation, hard disks/drives, flash memory, or any other suitable memory/storage element. In some embodiments, the non-volatile memory 347 and the additional storage 312 may be combined as a single non-volatile memory. The additional storage 312, when included, may be operatively connected to the processor 262 and may be used to store audio and/or video information captured by the video security device 300, as described in further detail below.

In some embodiments, the camera 204 and the infrared illumination source 372 may cooperate to facilitate night vision functionality of the video security device 300. For example, the photosensor 364 may be configured to detect a level of ambient light about the video security device 300. The processor 262 may use the input from the photosensor 364 to control operation of the infrared illumination source 372 and the camera 204 to activate and deactivate night vision, as described in further detail below. In some embodiments, the camera 204 may include a video recording sensor or a camera chip. In some embodiments, the infrared illumination source 372 may include one or more IR light-emitting diodes (LEDs).

The transfer of digital audio between the user (via the user's client device 214) and a visitor (or intruder) may be compressed and decompressed using the audio codec 366, as described below. The motion sensor 268 may include the radar sensor 202 and optionally include one or more passive infrared (PIR) sensors or other type of sensor capable of detecting and communicating to the processor 262 the presence and/or motion of an object within its field of view. When triggered by the motion sensor 268, the processor 262 may perform one or more functions, as described below.

In various embodiments, the radar sensor 202 is designed with different types of radar, including but not limited to, frequency-modulated continuous wave (FMCW) radar, pulse or pulse-Doppler radar, or a combination of one or more of these radar types. Thus, the radar sensor 202 may be a frequency-modulated continuous wave radar sensor or a pulse radar sensor, or a combination of the two, as will be discussed in more detail. Different types of frequency modulated (FM) radar may be referred to jointly as FM radar. The video security device 300 may further include, or be coupled to, one or more radar antenna, including at least one transmit antenna 303, coupled to a transmitter (Tx), in order to transmit radar signals, and one or more receive antenna 307, coupled to a receiver (Rx), to receive reflected radar signals. In one embodiment, the transmitter and receiver are combined and are simply referred to as a receiver.

In various embodiments, the FMCW radar, also referred to as continuous-wave frequency-modulated (CWFM) radar, is a short-range measuring radar set capable of determining distance, but also adaptable to include Doppler and thus the ability to measure the speed of a moving object, which aids in identifying objects. The distance measurement along with the speed measurement increases reliability when there is more than one source of reflection arriving at the radar antenna. In FMCW radar, the transmitted signal of a known stable frequency continuous wave varies up and down in frequency over a fixed period of time by a modulating signal. Frequency difference between the receive signal and the transmit signal increases with delay, and hence with distance. This smears out, or blurs, the Doppler signal. Reflections (or echoes) received back from a target are then mixed with the transmitted signal to produce a beat signal, which will give the distance of the target after demodulation.

The modulations possible in FMCW vary, so long as frequency varies, including but not limited to sine wave (like an air raid siren), sawtooth wave (like a chirp from a bird), triangle wave (like a police siren in the United States), or a square wave (like a siren in the United Kingdom). Sawtooth modulation is the most used in FMCW radars where range is desired for objects that may lack rotating parts. Range information is mixed with the Doppler velocity using this technique. Modulation can be turned off during alternate scans to identify velocity using unmodulated carrier frequency shift. This allows range and velocity to be found with one radar set. Triangle wave modulation can be used to achieve the same goal. Sinusoidal FM may be used when both range and velocity are desired simultaneously for complex objects with multiple moving parts like turbine fan blades, helicopter blades (including as on a drone), or propellers. This processing reduces the effect of complex spectra modulation produced by rotating parts that introduce errors into the range measurement process. For simplicity of explanation, all of these waveform FM types will be referred to as "chirps," meaning a cycle of a radar signal that changes in frequency throughout a period of time before repeating.

In various embodiments, operational parameters of FMCW radar may be adjusted to vary the amount of power consumed. These operational parameters include, but are not limited to, chirps per frame, frame per second (or frame rate), antenna configuration (e.g., number of active receive antennas being used), chirp duration, and the various digital signal processing (DSP) or central processing unit (CPU) functions employed to process received radar signals. In some embodiments, each radar sensor 202 may include a digital signal processor and at least one CPU, e.g., a processing core, to perform these functions. In other embodiments, the digital signal processor is located off-package of the radar sensor 202 and may be located elsewhere on the video security device 200, including possibly integrated within the processor 262. Regardless of where located, the radar sensor 202 as is referenced herein is assumed to include the digital signal processor and at least one CPU core.

In the disclosed embodiments, as discussed, a frame may be understood to be a period of time during which the radar sensor 202 samples the monitored area 201 to capture a data set capable of being processed by one or more processing functions to perform object detection. As such, each frame may include multiple chirps in order to capture sufficient data for object detection processing. The DSP/CPU functions include, but are not limited to, stationary object removal, range Fast Fourier Transform (FFT) processing, amplitude thresholding, angle of arrival estimation, and Doppler FFT processing.

An FFT is an algorithm that computes the discrete Fourier transform (DFT) of a sequence or its inverse (IDFT). Such Fourier analysis converts a signal from its original domain (such as time or space) to a presentation in the frequency domain and vice versa. An FFT reduces the number of computations needed for N points of the sequence from $2N^2$ to $2N*\lg(N)$, where "lg" is the base-2 logarithm. The discrete Fourier transform can be computed using an FFT by means of the Danielson-Lanczos lemma if the number of points N is a power of two. If the number of points N is not a power of two, a transform can be performed on sets of points corresponding to the prime factors of N, which is slightly degraded in speed. An efficient real Fourier transform algorithm or a fast Hartley transform gives a further increase in speed by approximately a factor of two. Base-4 and base-8 FFTs use optimized code, and can be 20-30% faster than base-2 FFTs. Prime factorization is slow when the factors are large, but discrete Fourier transforms can be made fast for N=2, 3, 4, 5, 7, 8, 11, 13, and 16 using the Winograd transform algorithm.

Fast Fourier transform (FFT) algorithms generally fall into two classes: decimation in time, and decimation in frequency. The Cooley-Tukey FFT algorithm first rearranges the input elements in bit-reversed order, then builds the output transform (decimation in time). The basic idea is to break up a transform of length N into two transforms of length N/2 using the identity $$\sum_{n=0}^{N-1} a_n e^{-2\pi i n k/N} = \sum_{n=0}^{N/2-1} a_{2n} e^{-2\pi i (2n)k/N} + \sum_{n=0}^{N/2-1} a_{2n+1} e^{-2\pi i (2n+1)k/N} =$$

$$\sum_{n=0}^{N/2-1} a_n^{even} e^{-2\pi i n k/(N/2)} + e^{-2\pi i k/N} \sum_{n=0}^{N/2-1} a_n^{odd} e^{-2\pi i n k/(N/2)},$$

sometimes called the Danielson-Lanczos lemma. The Sande-Tukey algorithm first transforms, then rearranges the output values, which is decimation in frequency. Any of these examples, or a combination thereof, for FFT processing are envisioned when FFT is referred to herein.

Stationary object removal is a process of subtracting one frame (or a combination of previous frames) from the current frame to remove any unchanging signals from the data. An object that has not moved will be zeroed out by doing this. The goal is to only look at objects that are moving in space across time.

Range FFT is the process of running the intermediate frequency (IF, the mixture of the transmitted signal with the incoming reflected signal) through an FFT to convert the received frequencies into distances. Ultimately, the time-delay of each reflected signal is what translates into a frequency, and the FFT translates this into a superposition of distances. Each distance will have some amplitude associated with it depending on how strong the received signal was from that target.

Amplitude thresholding is the process of setting some threshold above the measured background noise, and seeing if the amplitudes of received signals exceed that threshold. If exceeding, then a detection is possible.

Angle of Arrival (AoA) estimation may involve the triangulation of reflected signals to determine an angle at which the reflected signals are arriving. When multiple receive antennas 307 are enabled, it is possible to compare the phase data from each receiver coupled to the respective receive antenna. Depending on spatial separation of these receive antennas (distance and plane of separation), the radar sensor 202 may locate not only the distance of the targets, but also the angle from which the reflection arrived at the radar sensor 202. This allows localization of an object in two-dimensional (2D) or three-dimensional (3D) space rather than just a single dimensional distance.

With reference to Doppler FFT, when multiple chirps are enabled, the radar sensor 202 may perform a second FFT on received frames of data to not only resolve the distances of objects (from the first FFT), but also the speed at which the objects are moving (from the second FFT). This is more accurate than deducing the speed of objects by measuring distance/time throughout multiple frames. Use of the Doppler FFT may enable determining an identity of a detected object, such as resolving that the object detected is a human, not a cat or a leaf.

In various embodiments, a pulse radar is a radar system that employs a repetitive series of short-duration pulses that make up a larger pulse. Each larger pulse may thus define a pulse width or a pulse duration. A pulse repetition period, e.g., the period between each large pulse, may define a pulse rate, e.g., number of the large pulses per second. Each pulse in the series of short-duration pulses may be a different kind of wave, such as was discussed with reference to FMCW radar (sine, sawtooth, triangle, square), but, different from FMCW radar, are not continuous and do not change in frequency (unless using pulse-Doppler radar). The reflected radar signals, from the transmitted radar pulses, may be processed in order to determine distance.

In disclosed embodiments, the range accuracy of a pulse radar depends on the width of the pulse: the shorter the pulse, the better the accuracy. Short pulses, however, require wide bandwidths in the receiver and transmitter (since bandwidth is equal to the reciprocal of the pulse width). The bandwidth (BW) is the difference between the upper and lower cut-off frequencies of the transmitter and receiver, and is usually measured in hertz (Hz). The larger the bandwidth of the transmitter, the shorter the rise time of the edges of a rectangular pulse, for example. A radar with a pulse width of one microsecond can measure the range to an accuracy of a few tens of meters or better.

Since a pulse radar does not radiate continually, the average power is much less than the peak power. The average power, rather than the peak power, is the measure of the capability of a radar system. Radars have average powers from a few milliwatts (mW) to as much as one or more megawatts (MW), depending on the application. A pulse radar will consume more power at a higher bandwidth, thus lower pulse width, and at higher frequencies, thus higher pulse rates.

In some embodiments, a pulse-Doppler radar is a radar system that determines the range to a target using pulse-timing techniques, and uses the Doppler effect of the returned signal to determine the velocity of the target object. Further, application of the Doppler FFT on the returned signals may enable distinguishing objects from each other and enable identification of the target object. Thus, pulse-Doppler radar may be especially adept at distinguishing higher-speed objects (e.g., a sprinting person or a motor vehicle) in close proximity to large slow-moving objects, such as trees or bodies of water. Pulse-Doppler radar may thus combine the features of pulse radars and continuous-wave radars, which were formerly separate due to the complexity of the electronics.

The memory 340 may further include a rejected objects list 142, a buffer 348, and, in certain embodiments, may also include the volatile memory 346 and/or the non-volatile memory 347. The buffer 348 may be part of the volatile memory 346 and/or the non-volatile memory 347. The buffer 348 may be a rolling buffer such as a circular buffer, a circular queue, a cyclic buffer, or a ring buffer, or other data structure that uses a single, fixed-size buffer as if it were connected end-to-end. Video from the camera 204 may be stored in the buffer 348 in response to a certain trigger, such as when the video security device 300 transitions the radar sensor 202 from the first operational mode or the second operational mode to the second operational mode or the third operational mode, respectively, in response to certain types of motion detection, as will be discussed in more detail.

In some embodiments, if, after having transitioned the radar sensor 202 to a higher operational mode, the processor 262 determines, based on processing of received radar signals, that a detected object is not an object of interest (e.g., a person), then the processor 262 may store a radar signature of the detected object in the rejected objects list 142. The rejected objects list 142 may be a data structure such as a table, matrix, spreadsheet, or the like. During further operation of the video security device 300, the processor 262 may check detection data from a possible new object against the radar signature data stored in the rejected objects list 142 to determine that the possible new object is really a previously detected object of no interest. This could be, for example, movement of a branch, leaves, or a cat running through the yard. Alternatively, the object of no interest may be a person, but the person may be located outside of a region of interest in the field of view of the radar sensor 202. In response to determining the possible new object is not of interest in this way, the processor 262 may continue to operate at, or transition the radar sensor 202 back to, a lower operational mode to save power.

The communication module 390 includes at least one antenna 395, and is configured to handle communication between the video security device 300 and other, external devices or receivers, and to route incoming/outgoing data appropriately. For example, inbound data from the antenna 395 may be routed through the communication module 390 before being directed to the processor 262, and outbound data from the processor 262 may be routed through the communication module 390 before being directed to the antenna 395. The communication module 390 may include one or more transceiver modules capable of transmitting and receiving data, and using, for example, one or more protocols and/or technologies, such as a Wi-Fi network compatible with the IEEE 802.11 standard and/or other wireless communication standard(s) including but not limited to WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), Z-Wave, RIM (Research in Motion, Limited) duplex paging network, Bluetooth radio, or an IEEE 802.11-based radio frequency network or any other protocol and/or technology. In the illustrated embodiment, the communication module 390 may include a Wi-Fi chip 391 and a Bluetooth chip 392 that implement medium-range wireless communication protocols and short-range wireless communication protocols, respectively, but these components are merely examples and are not limiting. Further, while the Wi-Fi chip 391 and the Bluetooth chip 392 are illustrated within the box representing the communication module 390, the embodiment illustrated in FIG. 3 is merely an example, and in some embodiments the Wi-Fi chip 391 and/or the Bluetooth chip 392 may not necessarily be physically incorporated with the communication module 390.

In some embodiments, the communication module 390 may further include a wireless repeater (not shown, may also be referred to as a wireless range extender). The wireless repeater may be configured to receive a wireless signal from a wireless router (or another network device) in the user's wireless network 210 and rebroadcast the signal. Wireless devices that are not within the broadcast range of the wireless router, or that only weakly receive the wireless signal from the wireless router, may receive the rebroadcast signal from the wireless repeater of the communication module 390, and may thus connect to the user's wireless network 210 through the video security device 300. In some embodiments, the wireless repeater may include one or more transceiver modules (not shown) capable of transmitting and receiving data, and using, for example, one or more medium-range wireless communication protocols and/or technologies, such as Wi-Fi (IEEE 802.11), long-range wireless communication protocols, such as WiMAX (IEEE 802.16), or any other protocol and/or technology.

When a visitor (or intruder) in the monitored area 201 speaks, audio from the visitor (or intruder) is captured by the microphone 206 and may be compressed by the audio codec 366. Digital audio data may then be sent through the communication module 390 to the network 212 (FIG. 1) (in some embodiments via the user's wireless network 210), routed by the server 118 and/or the API 220, and delivered to the user's client device 214. When the user speaks, the user's client device 214 may capture digital audio data, which may then be transferred through the network 212 and/or the user's wireless network 210, the communication module 390, and the processor 262 to the audio codec 366 where it is decoded and emitted to the visitor through the speaker 208, which may be driven by an audio driver.

The input device 382 may have one or more functions, such as changing an operating mode of the video security device 300 and/or triggering a reset of the video security device 300. For example, when the input device 382 is activated (e.g., pressed and released), it may cause the communication module 390 of the video security device 300 to enter an access point (AP) mode, which may facilitate connecting the video security device 300 to the user's wireless network 210 and/or the network 212. Alternatively, or in addition, when the input device 382 is activated (e.g., pressed and held) for at least a threshold amount of time, it may trigger the erasing of any data stored by the volatile memory 346 and/or by the non-volatile memory 347, and/or may trigger a reboot of the processor 262.

In certain embodiments, the video security device 300 may be configured to recognize a "wake-up" word or phrase (e.g., using the microphone 206 and the processor 262) that triggers a command input mode. When the command input mode is triggered, the video security device 300 detects, using the microphone 206, a verbal command that may be recognized to cause the video security device 300 to perform an action. For example, in an embodiment, when the user, within the monitored area 201, says the wake-up word or phrase followed by "turn on the lights," the video security device 300 activates the illumination source 370. Similarly, in another embodiment, when the user, within the monitored area 201, says the wake-up word or phrase followed by "turn off the lights," the video security device 300 deactivates the illumination source 370. In certain embodiments, recognition of the wake-up word or phrase may only occur when the motion sensor 268 and/or the camera 204 detects motion within the monitored area 201. In some embodiments, the available commands may be preconfigured within the video security device 300. In other embodiments, the recognizable commands may be learned by the video security device 300 from the user. In some embodiments, the video security device 300 may be trained to recognize the voice of the user, and thereafter respond only to commands when that voice is recognized.

In certain embodiments, the video security device 300 may use the camera 204 to recognize a face (e.g., the face of an authorized user). For example, in an embodiment, the video security device 300 may include a learn mode through which the face(s) of one or more authorized user(s) is/are learned and stored within the non-volatile memory 347. Upon detecting and recognizing an authorized user's face, the video security device 300 may enter a command input mode, in another embodiment, whereby verbal commands from the authorized user are interpreted and executed by the video security device 300. In one example, where the authorized user stands facing the video security device 300 and says "turn the lights on," the security device of certain embodiments activates the illumination source 370 after recognizing the authorized user's face. Similarly, when the authorized user faces the video security device 300 and says "turn off the lights," the video security device 300 may deactivate the illumination source 370 after recognizing the authorized user's face. In some embodiments, the video security device 300 uses a lip-reading algorithm to interpret the authorized user's verbal command. In some embodiments, the video security device 300 detects gesture(s) by the authorized user, interpret the gesture as a command, and then executes that command. For example, where the authorized user faces the video security device 300 and makes an arm waving gesture, once the video security device 300 recognizes the face of the authorized user, the video security device 300 of this example detects the arm waving movements and activates the illumination source 370.

In certain embodiments, the radar sensor 202 is able to distinguish different types of objects within the monitored area 201, where functionality of the video security device 300 may vary depending upon the type of object detected within the monitored area 201. For example, in an embodiment, the illumination source 370 may be activated when a vehicle and/or a person is detected, whereas audio/video data may start recording only when a person is detected (e.g., no recording when only a vehicle is detected and not a person). As discussed, the radar sensor 202 may use Doppler FFT processing to determine whether or not the detected object is a human.

In some embodiments, the radar sensor 202 is a stand-alone device with integrated digital signal processing and other processing capabilities to perform the processing functions disclosed herein. In other words, the radar sensor 202 is not integrated into an A/V recording and communication device. The stand-alone device may be a motion sensor that may function within a larger security alarm system, for example. In one embodiment, the radar sensor 202 is fitted within a housing, includes a power source, such as a battery, and is networked to a hub or base station of the security system, and optionally also to the client device 214.

Figure 5:
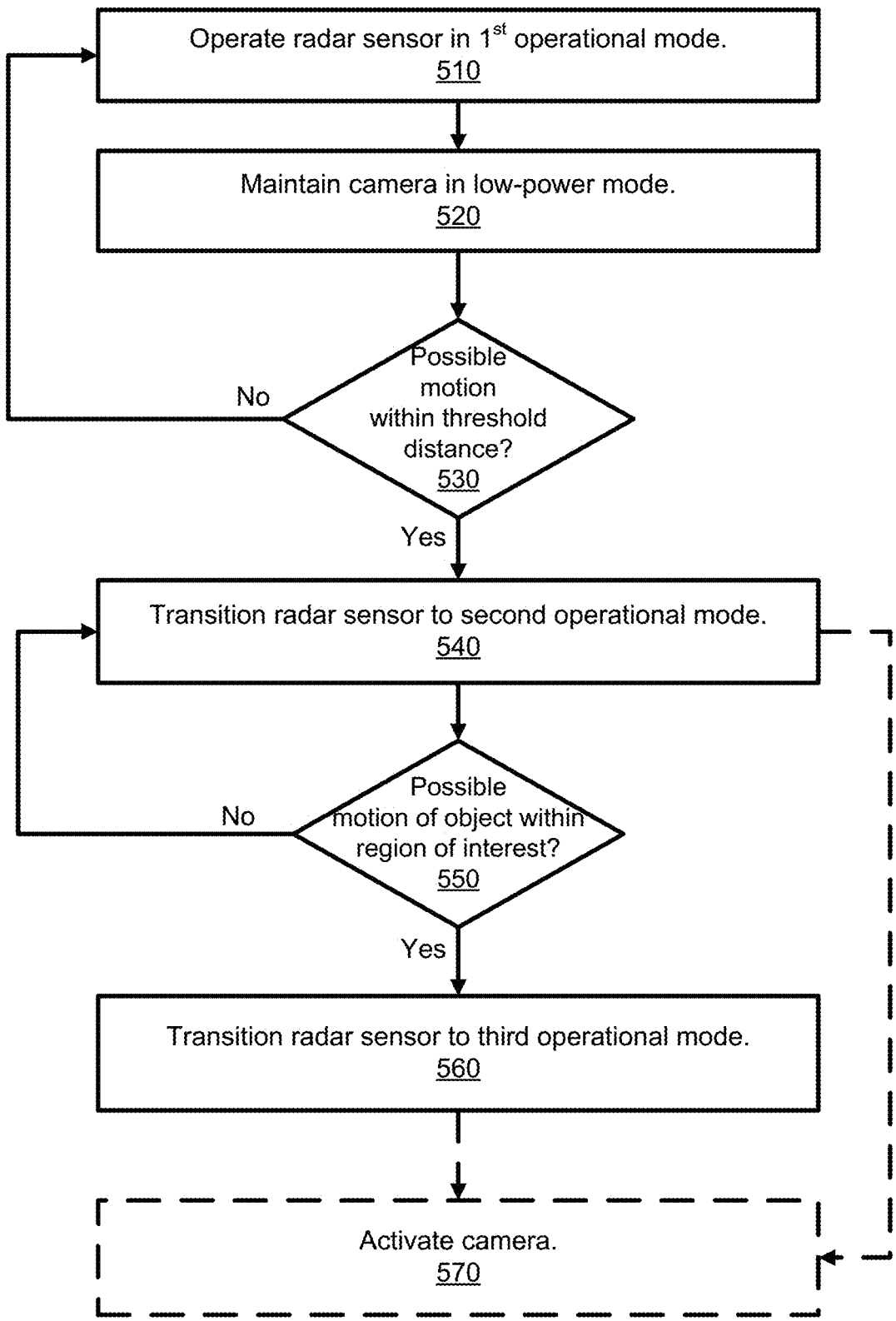
FIG. 5 is a flowchart of a method for operating a radar sensor-based A/V recording and communication device in an embodiment.

FIG. 5 is a flowchart of a method 500 for operating a radar sensor-based A/V recording and communication device in an embodiment. The method 500 may be performed by processing logic that may include hardware (circuitry, dedicated logic, etc.), software (such as is run on a general purpose computer system or a dedicated machine), firmware, or some combination thereof. For example, the method 500 may be performed by the video security device 200 or 300, and particularly by the processor 262 executing instructions stored in the memory 340 for performance of aspects of the method 500. The method 500 may be performed with the assumption of the radar sensor 202 being capable of operating in at least three different operational modes of increasingly greater power consumption.

At operation 510, the processing logic operates the radar sensor in a first operational mode, e.g., the idle mode 103. At operation 520, the processing logic maintains the camera 204 in a low-power mode when the radar sensor 202 is in the first operational mode. At operation 530, the processing logic determines, using the radar sensor 202 in the first operational mode, whether possible motion of an object is detected within a threshold distance from the radar sensor 202. If not, the processing logic may loop back to operation 510 and continue to operate the radar sensor 202 in the first operational mode.

If yes (at operation 530), then in response to possible motion being detected, at operation 540, the processing logic transitions the radar sensor 202 from the first operational mode to a second operational mode, e.g., the observational mode 105, the second operational mode consuming more power than the first operational mode. At operation 550, the processing logic determines, using the radar sensor 202 in the second operational mode, whether the possible motion of the object occurred in a region of interest. If the possible motion did not occur in the region of interest, the processing logic may loop back to the operation 540 and continue operating the radar sensor 202 in the second operational mode.

Responsive to determining that the possible motion of the object occurred in the region of interest, at operation 560, the processing logic transitions the radar sensor 202 from the second operational mode to a third operational mode, e.g., the identifying mode 111, the third operational mode consuming more power than the second operational mode. At operation 570, the processing logic also may activate the camera 204, e.g., in response to transitioning the radar sensor 202 to the third operational mode.

In one embodiment, the radar sensor 202 of the method 500 is a FMCW radar sensor, and each of the operational modes are selected according to varying power levels and corresponding operational parameters that were disclosed and discussed in detail with reference to Tables 1, 3, and 5, which correspond respectively to the first operational mode, the second operational mode, and the third operational mode. Varying operational parameters are envisioned for varying ranges of average power consumption.

In another embodiment, the radar sensor 202 of the method 500 is a pulse radar sensor, and each of the operational modes are selected according to varying power levels and corresponding operational parameters that were disclosed and discussed in detail with reference to Tables 2, 4, and 6, which correspond respectively to the first operational mode, the second operational mode, and the third operational mode. Varying operational parameters are envisioned for varying ranges of average power consumption.

Further, where the radar sensor 202 is a pulse radar device, the processing logic may, when in the first operational mode, cause the radar sensor to emit first radar signals, having a first width, at a first rate. The processing logic may further, when in the second operational mode, cause the radar sensor to emit second radar signals, having a second width, at a second rate, wherein the second rate is greater than the first rate and the second width is less than the first width. The processing logic may further, when in the third operational mode, cause the radar sensor to emit third radar signals, having a third width, at a third rate, wherein the third rate is greater than the second rate and the third width is less than the second width.

Figure 6:
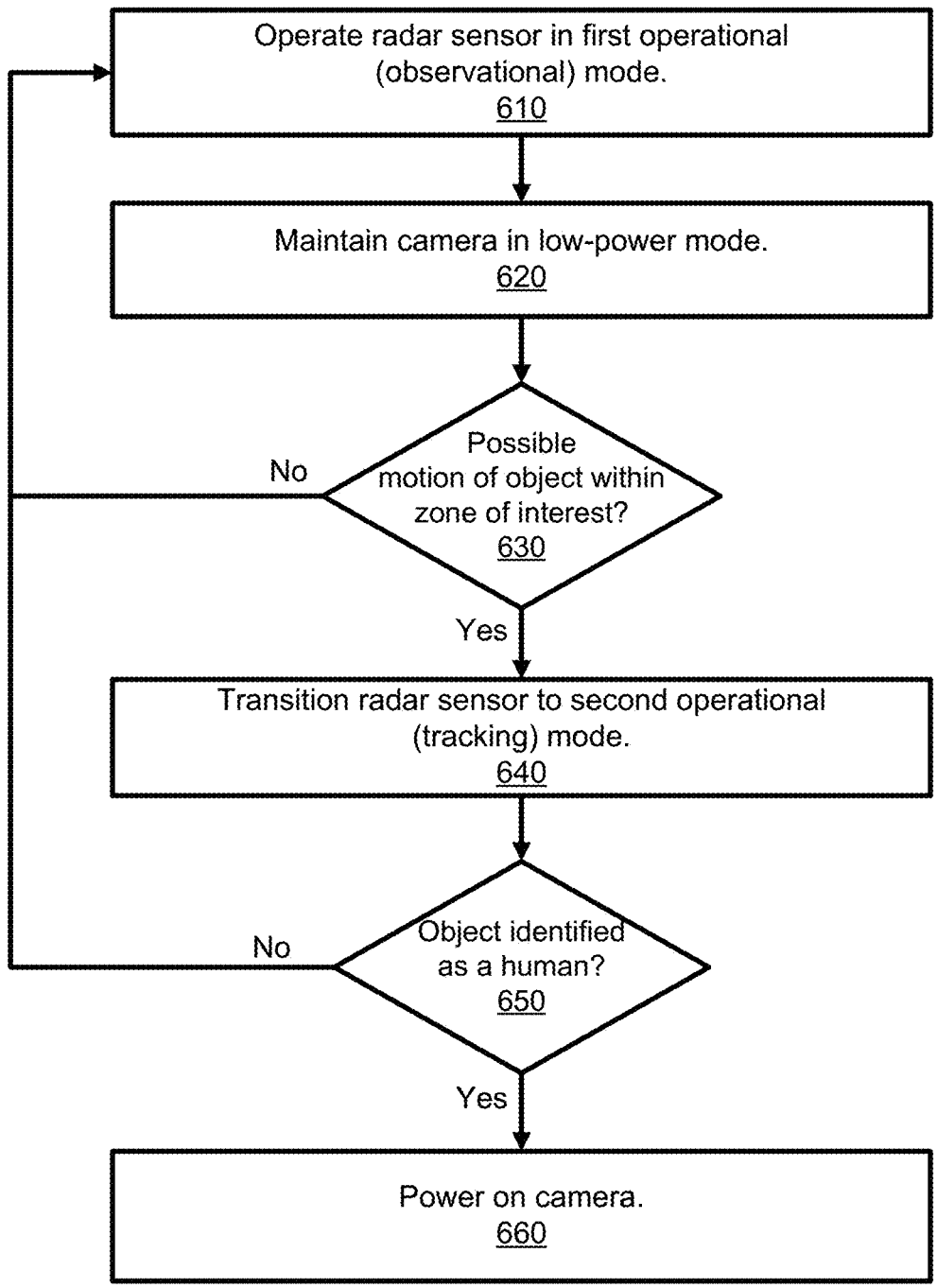
FIG. 6 is a flowchart of a method for operating a radar sensor-based A/V recording and communication device in another embodiment.

FIG. 6 is a flowchart of a method 600 for operating a radar sensor-based A/V recording and communication device in another embodiment. The method 600 may be performed by processing logic that may include hardware (circuitry, dedicated logic, etc.), software (such as is run on a general purpose computer system or a dedicated machine), firmware, or some combination thereof. For example, the method 600 may be performed by the video security device 200 or 300, and particularly by the processor 262 executing instructions stored in the memory 340 for performance of aspects of the method 600. The method 600 may be performed with the assumption of the radar sensor 202 being capable of operating in at least two different operational modes of increasingly greater power consumption, including a first operational mode (the observational mode) and a second operational mode (the identifying mode).

At operation 610, the processing logic operates the radar sensor 202 in a first operational mode, e.g., the observational mode 105 in this embodiment. At operation 620, the processing logic maintains the camera in a low-power mode when the radar sensor 202 is in the first operational mode.

At operation 630, the processing logic may determine, using the radar sensor 202 in the first operational mode, whether the possible motion of an object is detected within a region of interest, e.g., a region of likely ingress and egress of humans projecting out from the radar sensor 202. If not, and for example the object is detected outside of the region of interest, the processing logic may loop back to operation 610 and continue operating the radar sensor 202 in the first operational mode.

If yes (at operation 630), then at operation 640, responsive to detecting the possible motion of the object within the region of interest, the processing logic transitions the radar sensor 202 from the first operational mode to a second operational mode, e.g., the identifying mode 111 in this embodiment, the second operational mode consuming more power than the first operational mode. At operation 640, the processing logic determines whether, using the radar sensor 202 in the second operational mode, the object is a human. For example, performing the Doppler FFT processing in the second operational mode enables determining that the object is human. If not a human, the processing logic may loop back to operation 610 in transitioning the radar sensor 202 from the second operational mode to the first operational mode. At operation 660, responsive to determining that the object is a human, the processing logic powers on a camera of the video recording device. The camera 204 may then record video and store the video in the buffer 348 of the memory 340.

In one embodiment, the radar sensor 202 of the method 600 is a FMCW radar sensor, and each of the operational modes are selected according to varying power levels and corresponding operational parameters that were disclosed and discussed in detail with reference to Tables 3 and 5, which correspond respectively to the second operational mode and the third operational mode. In a further embodiment, the processing logic employs a first chirp duration within the radar sensor 202 (which is an FMCW radar sensor) when operating the radar sensor 202 in the first operational mode, and employs a second chirp duration within the radar sensor 202 when operating the radar sensor 202 in the second operational mode, the second chirp duration being longer than the first chirp duration.

In an alternative embodiment, the radar sensor 202 of the method 600 is a pulse radar sensor, and each of the operational modes are selected according to varying power levels and corresponding operational parameters that were disclosed and discussed in detail with reference to Tables 4 and 6, which correspond respectively to the second operational mode and the third operational mode. In a further embodiment, the processing logic, when operating in the first operational mode, causes the radar sensor 202 (which is a pulse radar sensor) to emit first radar signals, having a first width, at a first rate. The processing logic may further, when operating in the second operational mode, cause the radar sensor 202 to emit second radar signals, having a second width, at a second rate, wherein the second rate is greater than the first rate and the second width is less than the first width.

Figure 7:
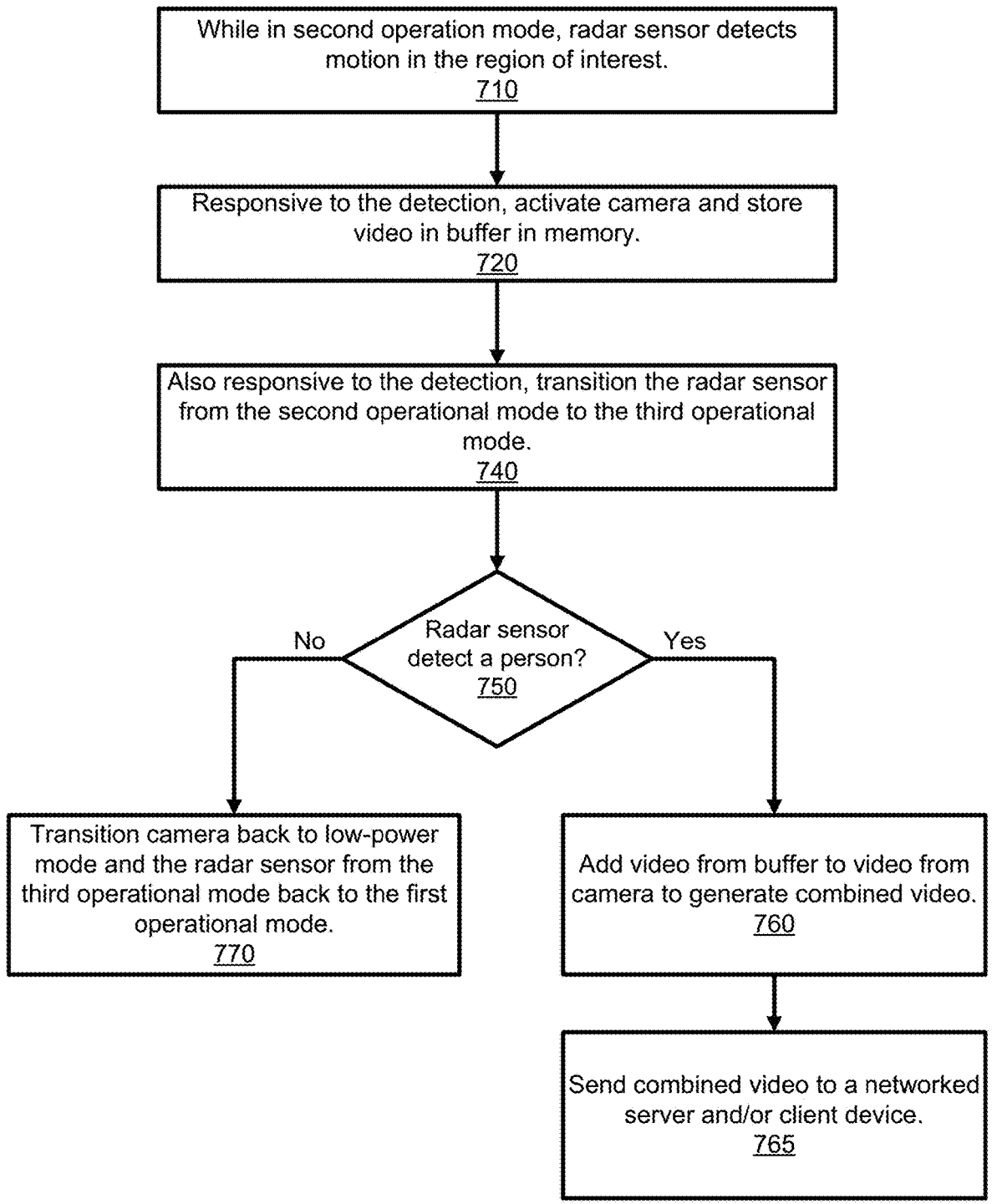
FIG. 7 is a flowchart of a method for operating a radar sensor-based A/V recording and communication device in still another embodiment.

FIG. 7 is a flowchart of a method 700 for operating a radar sensor-based A/V recording and communication device in still another embodiment. The method 700 may be performed by processing logic that may include hardware (circuitry, dedicated logic, etc.), software (such as is run on a general purpose computer system or a dedicated machine), firmware, or some combination thereof. For example, the method 700 may be performed by the video security device 200 or 300, and particularly by the processor 262 executing instructions stored in the memory 340 for performance of aspects of the method 700.

At operation 710, the processing logic, while in the second operational mode, detects, using the radar sensor 202, motion within the region of interest 450. The motion may be detected with relation to an object moving within the monitored area 201. At operation 720, the processing logic, responsive to the detection in operation 710, activates the camera 204 and stores video, of the field of view of the camera, in the buffer 348 in memory. This video may be buffered before knowing if the object is a person (or other threat).

At operation 740, the processing logic, also responsive to the detection, transitions the radar sensor 202 from the second operational mode to the third operational mode. This transition to the third operational mode may be in response to detecting motion within the region of interest 450. At operation 750, the processing logic determines whether the radar sensor 202 detects a person (or other threat), e.g., whether the object is identified as a person (or other threat). In the third operational mode, identification of the detected object is possible, and thus the processing logic can determine whether the detected object is a threat.

If yes (at operation 750), at operation 760, the processing logic adds video from the buffer 348 to video being transmitted from the camera 204 to generate a combined video. At operation 765, the processing logic sends this combined video to a networked server such as the server 218. The processing logic may also, or alternatively, send the combined video to the client device 214. In this way, video is captured before and after determination that the object is a threat, and both portions of video may be sent in response to identifying the object as a person (or other threat). If no (at operation 750), at operation 770, the processing logic transitions the camera 204 back to the low-power mode and transitions the radar sensor 202 from the third operational mode back to the first operational mode. In this way, if no person or other threat is detected, the processing logic transitions operation of the radar sensor 202 to the first operational mode to continue saving on power consumption. In alternative embodiments, at operation 760, the video from the buffer 348 may be transmitted to the server 218 separately from the video being transmitted from the camera 204 to the server 218. The server 218 may then combine the video from the buffer 348 with the video from the camera 204 to generate the combined video.

Disclosed embodiments may be applied to adapting a radar sensor for use in an audio/video (A/V) recording and communication device that operates at low power. Such devices may include video security devices (e.g., security cameras, video recording devices) and the like that may or may not have audio capability. Low power may be supplied by some power sources such as batteries, fuel cells, or solar cells, for example. Radar sensors can provide a much higher accuracy than traditional passive infrared (PIR) sensors when used for outdoor motion detection applications such as on security cameras. A PIR sensor can still operate at a much lower power consumption (e.g., lower than 20 microwatts is possible) compared to a radar sensor, which may consume as much as several watts in a full-featured radar system. Even at a milliwatt for a complete PIR motion-detecting system, which includes a microcontroller to filter and interpret data, a PIR sensor may be easy to integrate within a battery powered device.

In one embodiment, a low-powered video security device employs a PIR sensor as a primary sensor that, when sensing a certain amount of motion, triggers activation of a secondary radar sensor to verify the motion. This would allow the radar sensor to remain in a low-power mode until being activated by the PIR sensor. This design, however, may involve latency and complexity, and not resolve the false negatives that often impact performance of PIR sensors. If the PIR sensor is not triggered, the radar sensor will not be triggered either in this embodiment.

In another embodiment, the low-powered video security device employs a radar sensor instead of a PIR sensor, where the radar sensor is phased into increasing levels of activation depending on distance and/or location of motion detection. For example, radar sensors employ a number of operational parameters that may be adjusted to operate the radar sensor in various operational modes, each differing in amount of power consumption compared to others. These parameters are discussed herein, and may differ depending on the type of radar employed.

While multiple operational modes are envisioned, varying levels of power within a radar sensor may include at least an idle mode (referred to herein sometimes as a first operational mode), at least an observational mode (referred to herein sometimes as a second operational mode), and at least an identifying mode (referred to herein sometimes as a third operational mode). The second operational mode may consume more power than the first operational mode, and the third operational mode may consume more power than the second operational mode. In the first operational mode, the radar sensor can detect motion of an object, and may be able to determine distance to the object. In one embodiment, the radar sensor, in the second operational mode, is able to detect where motion is occurring, and thus when an object may pass into a region of interest for security purposes. In some embodiments, the radar sensor, in the third operational mode, is able to determine what the object is, and thus resolve whether the object is human or not. In some embodiments, where there is no idle mode, the observational mode may be referred to herein as the first operational mode and the identifying mode may be referred to herein as the second operational mode.

In various embodiments, the video security device controls the radar sensor in these various operational modes depending on the amount and/or location of possible motion detected. For example, in the absence of detecting motion, the video security device may normally operate in the mode of least complexity (e.g., idle mode) in order to save power. In response to detecting possible motion of an object within a threshold distance, such as within a security perimeter, the video security device may transition the radar sensor to the mode of mid-level complexity (e.g., observational mode). Further, in response to detecting that the motion of the object occurred within a region of interest, the video security device may transition the radar sensor to the mode of greatest complexity (e.g., identifying mode). As further power-saving features, the video security device may activate other security components (such as a microphone, speaker, or camera) of the device in response to transitioning the radar sensor to the identifying mode or upon detecting an object of interest, depending on application or configuration. In this way, the video security device may be adapted to control a multimode radar sensor in a variable fashion depending on the location and type of motion detected in order to save power. By saving power, the video security device may operate on a single charge or from a low-power source for an extended period of time without the inconvenience of recharging, replacing, or augmenting the power source.

Figure 8:
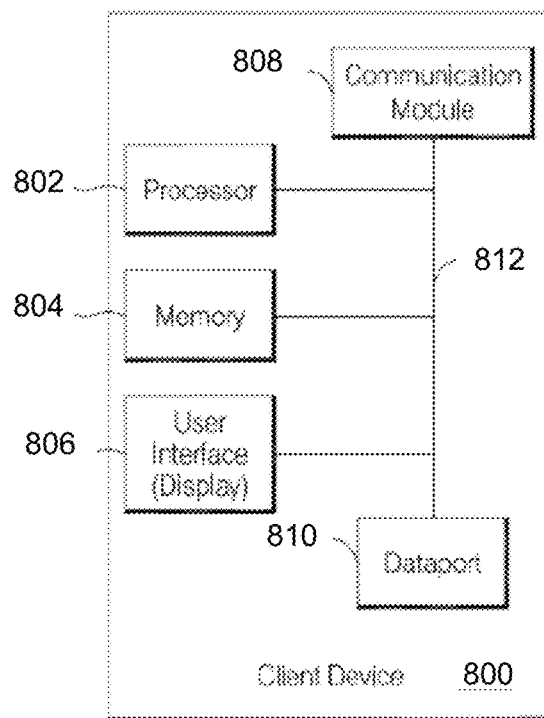
FIG. 8 is a functional block diagram of a client device on which the present embodiments may be implemented according to various aspects of the present disclosure.

FIG. 8 is a functional block diagram of a client device 800 on which the present embodiments may be implemented according to various aspects of the present disclosure. The client device 214 described with reference to FIG. 2 may include some or all of the components and/or functionality of the client device 800. The client device 800 may include, for example, a smartphone.

With reference to FIG. 8, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an Advanced RISC Machines (ARM) processor (a processor based on the RISC (reduced instruction set computer) architecture developed by ARM). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may include a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such a Wi-Fi network compatible with the IEEE 802.11 standard and/or other wireless communication standard(s) including but not limited to WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), Z-Wave, RIM (Research in Motion, Limited) duplex paging network, Bluetooth radio, or an IEEE 802.11-based radio frequency network, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 9:
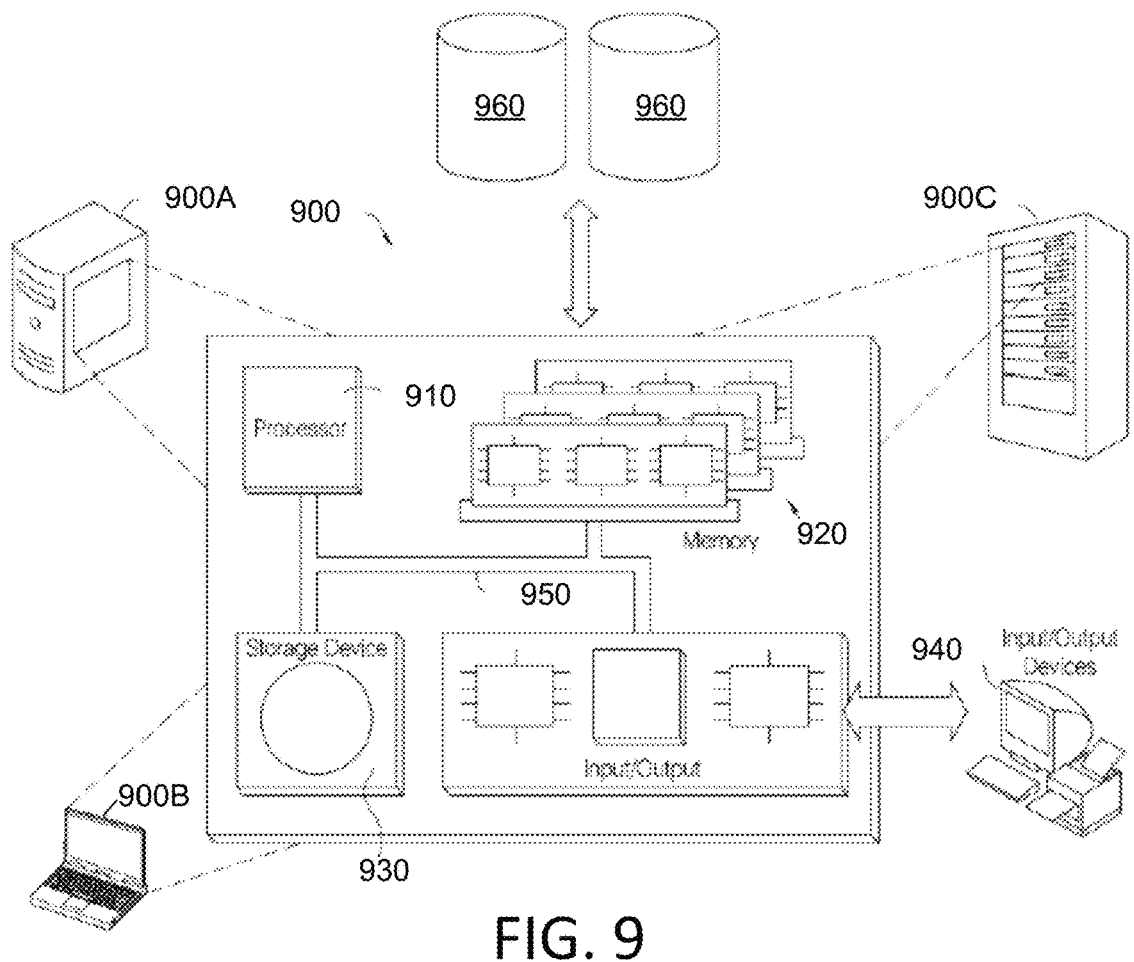
FIG. 9 is a functional block diagram of a computing system on which the present embodiments may be implemented according to various aspects of present disclosure.

FIG. 9 is a functional block diagram of a computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the processor 910, the memory 920, the storage device 930, and the I/O device 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the computer system 900, and may be a computer-readable medium. In various aspects, the storage device(s) 930 may be a flash memory device, a hard disk device, an optical disk device, a tape device, or any other type of storage device.

The I/O devices 940 may provide input/output operations for the computer system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A video recording and communication device comprising:
    a housing;
    a battery within the housing;
    a camera within the housing;
    a processor within the housing; and
    a radar sensor within the housing coupled to the battery and communicatively coupled with the processor, the radar sensor configured to operate in one of multiple operational modes comprising: a first operational mode that excludes angle of arrival (AoA) estimation and Doppler Fast Fourier Transform (FFT) processing, a second operational mode that includes AoA estimation and excludes Doppler FFT processing, and a third operational mode that includes AoA estimation and Doppler FFT processing;
    wherein the processor is coupled with the camera and configured to:
        operate the radar sensor in the first operational mode when no motion is detected in a field of view of the radar sensor;
        transition the radar sensor from the first operational mode to the second operational mode when motion of an object is detected within a threshold distance from the radar sensor, the second operational mode consuming more power than the first operational mode;
        determine, using the radar sensor in the second operational mode, that the motion of the object occurred in a region of interest that is located within a perimeter defined by the threshold distance from the radar sensor;
        responsive to determining that the motion of the object occurred in the region of interest, transition the radar sensor from the second operational mode to a third operational mode, the third operational mode consuming more power than the second operational mode;
        determine, using the radar sensor in the third operational mode, that the object is a person; and
        responsive to determining that the object is a person, power up the camera.

2. The video recording and communication device of claim 1, wherein,
    in the first operational mode, the radar sensor performs stationary object removal, range FFT processing, and amplitude thresholding;
    in the second operational mode, the radar sensor performs stationary object removal, range FFT processing, amplitude thresholding, and AoA estimation; and
    in the third operational mode, the radar sensor performs stationary object removal, range FFT processing, amplitude thresholding, AoA estimation, and Doppler FFT processing.

3. A video recording and communication device comprising:
    a camera;
    at least one processor;
    a radar sensor communicatively coupled with the processor, the radar sensor comprising a first transmitter, a first receiver, and a second receiver; and
    a memory storing instructions that, when executed by the at least one processor, cause the video recording and communication device to perform operations comprising:
        operating the radar sensor in a first operational mode that utilizes the first transmitter and the first receiver and does not utilize the second receiver;
        maintaining the camera in a low-power mode when the radar sensor is in the first operational mode;
        detecting, using the radar sensor in the first operational mode, possible motion of an object within a threshold distance from the radar sensor;
        responsive to the detecting of the possible motion of the object, transitioning the radar sensor from the first operational mode to a second operational mode that utilizes the first transmitter, the first receiver, and the second receiver, the second operational mode consuming more power than the first operational mode;
        determining, using the radar sensor in the second operational mode, that the possible motion of the object occurred in a region of interest; and
        responsive to the determining that the possible motion of the object occurred in the region of interest, transitioning the radar sensor from the second operational mode to a third operational mode, the third operational mode consuming more power than the second operational mode.

4. The video recording and communication device of claim 3, wherein the operations further comprise activating the camera responsive to transitioning the radar sensor to the second operational mode.

5. The video recording and communication device of claim 4, wherein the operations further comprise causing the camera to record video and store the video in a buffer.

6. The video recording and communication device of claim 4, wherein operations further comprise:

transmitting, by the transmitter while using the radar sensor in the first operational mode, a first number of radar frames in a first time interval;

transmitting, by the transmitter while using the radar sensor in the second operational mode, a second number of radar frames in the first time interval, the second number being greater than the first number; and transmitting, by the transmitter while using the radar sensor in the third operational mode, a third number of radar frames in the first time interval, the third number being greater than the second number.

7. The video recording and communication device of claim 4, wherein the operations further comprise:

generating, based on a signal received at the first receiver, first radar data;

generating, based on a signal received at the second receiver, second radar data; and based on operating in the second operational mode, determining an angle of arrival using the first radar data and the second radar data; and wherein the determining that the possible motion of the object occurred in a region of interest is based on the determining of the angle of arrival.

8. The video recording and communication device of claim 7, wherein the operations further comprise:

generating, based on a signal received at the first receiver, third radar data;

generating, by performing a discrete Fourier transform using a fast Fourier transform algorithm and the third radar data, range-FFT data; and based on operating in the third operational mode, generating, by performing a discrete Fourier transform using a fast Fourier transform algorithm and the range-FFT data, Doppler-FFT data.

9. The video recording and communication device of claim 3, wherein the operations further comprise:

determining, using the radar sensor in the third operational mode, that the object is not of interest;

storing, in a rejected objects list stored in the memory, radar signature data associated with the object; and transitioning the radar sensor back to the first operational mode.

10. The video recording and communication device of claim 9, wherein the object is a first object, wherein the operations further comprise:

detecting, using the radar sensor, possible motion of a second object within the threshold distance from the radar sensor;

storing, in the memory, detection data associated with the second object;

determining, via comparison of the detection data associated with the second object to the radar signature data associated with the first object stored in the rejected objects list, that the second object is the first object; and maintaining operation of the radar sensor in the first operational mode.

11. The video recording and communication device of claim 9, wherein the object is a first object, and wherein the operations further comprise:

detecting, using the radar sensor, possible motion of a second object within the threshold distance from the radar sensor;

storing, in the memory, detection data associated with the second object;

responsive to detecting the possible motion of the second object, transitioning the radar sensor from the first operational mode to the second operational mode;

while operating the radar sensor in the second operational mode, determining, via comparison of the detection data associated with the second object to the radar signature data associated with the first object stored in the rejected objects list, that the second object is the first object; and responsive to determining that the second object is the first object, transitioning operation of the radar sensor from the second operational mode to the first operational mode.

12. The video recording and communication device of claim 3, wherein the operations further comprise causing the radar sensor to, in the first operational mode, performstationary object removal, range Fast Fourier Transform processing, and amplitude thresholding.

13. The video recording and communication device of claim 3, wherein the radar sensor comprises a frequency-modulated continuous wave radar sensor, and the first operational mode comprises operational parameters including:

between 80 and 140 microseconds per chirp; and utilizing only one active receive antenna with the first receiver.

14. The video recording and communication device of claim 3, wherein the operations further comprise causing the radar sensor to, in the second operational mode, perform stationary object removal, range FFT processing, amplitude thresholding, and AoA estimation.

15. The video recording and communication device of claim 3, wherein the radar sensor comprises a frequency-modulated continuous wave radar sensor, and the second operational mode comprises operational parameters including:

between 330 and 550 microseconds per chirp; and utilizing two active receive antennas with the first receiver and the second receiver, respectively.

16. The video recording and communication device of claim 3, wherein the operations further comprise causing the radar sensor to, in the third operational mode, perform stationary object removal, range Fast Fourier Transform (FFT) processing, amplitude thresholding, angle of arrival estimation, and Doppler FFT processing.

17. The video recording and communication device of claim 3, wherein the radar sensor comprises a frequency-modulated continuous wave radar sensor, and the third operational mode comprises operational parameters including:

between 900 and 1300 microseconds per chirp; and utilizing at least two active receive antennas with the first and second receivers.

18. The video recording and communication device of claim 3, wherein the operations further comprise:

when in the first operational mode, causing the radar sensor to emit first radar signals, having a first width, at a first rate;

when in the second operational mode, causing the radar sensor to emit second radar signals, having a second width, at a second rate, wherein the second rate is greater than the first rate and the second width is less than the first width; and when in the third operational mode, causing the radar sensor to emit third radar signals, having a third width, at a third rate, wherein the third rate is greater than the second rate and the third width is less than the second width.

19. A method comprising:

operating a radar sensor, of a video recording device, in a first operational mode that includes angle of arrival (AoA) estimation and excludes Doppler Fast Fourier Transform (FFT) processing;

maintaining a camera of the video recording device in a low-power mode when the radar sensor is in the first operational mode;

detecting, using the radar sensor in the first operational mode, possible motion of an object within a region of interest;

responsive to detecting the possible motion of the object within the region of interest, transitioning the radar sensor from the first operational mode to a second operational mode that includes AoA estimation and Doppler FFT processing, the second operational mode consuming more power than the first operational mode;

determining first data using the radar sensor in the second operational mode and using the Doppler FFT processing; and based on the first data, powering on a camera of the video recording device.

20. The method of claim 19, wherein operating the radar sensor in the first operational mode comprises performing stationary object removal, range FFT processing, amplitude thresholding, and AoA estimation.

21. The method of claim 19, wherein operating the radar sensor in the second operational mode comprises performing stationary object removal, range FFT processing, amplitude thresholding, AoA estimation, and Doppler FFT processing, wherein performing the Doppler FFT processing in the second operational mode enables determining that the object is a human.

22. The method of claim 19, the radar sensor comprising a frequency-modulated continuous wave radar sensor, the method further comprising:

employing a first chirp duration within the radar sensor when operating the radar sensor in the first operational mode; and employing a second chirp duration within the radar sensor when operating the radar sensor in the second operational mode, the second chirp duration being longer than the first chirp duration.

23. The method of claim 19, further comprising:

when operating in the first operational mode, causing the radar sensor to emit first radar signals, having a first width, at a first rate; and when operating in the second operational mode, causing the radar sensor to emit second radar signals, having a second width, at a second rate, wherein the second rate is greater than the first rate and the second width is less than the first width.

24. The method of claim 19, the method further comprising determining, using the radar sensor in the second operational mode and based on the first data, that the object is a human, and wherein the powering on of the camera of the video recording device is based on the determining that the object is a human.

\* \* \* \* \*